(12) United States Patent
Bauknecht et al.

(10) Patent No.: US 7,678,008 B2
(45) Date of Patent: Mar. 16, 2010

(54) MULTI-STEP AUTOMATIC GEARBOX

(75) Inventors: Gert Bauknecht, Friedrichshafen (DE); Peter Ziemer, Tettnang (DE); Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 448 days.

(21) Appl. No.: 11/659,489

(22) PCT Filed: Aug. 8, 2005

(86) PCT No.: PCT/EP2005/008585

§ 371 (c)(1),
(2), (4) Date: Sep. 24, 2007

(87) PCT Pub. No.: WO2006/015836

PCT Pub. Date: Feb. 16, 2006

(65) Prior Publication Data

US 2008/0103013 A1    May 1, 2008

(30) Foreign Application Priority Data

Aug. 6, 2004    (DE) ...................... 10 2004 038 287

(51) Int. Cl.
*F16H 3/62* (2006.01)
(52) U.S. Cl. ..................................... 475/275
(58) Field of Classification Search ......... 475/275–278, 475/284
See application file for complete search history.

(56) References Cited

U.S. PATENT DOCUMENTS

| | | | |
|---|---|---|---|
| 5,106,352 A | 4/1992 | Lepelletier | |
| 6,139,463 A | 10/2000 | Kasuya et al. | |
| 6,558,287 B2* | 5/2003 | Hayabuchi et al. | 475/271 |
| 6,634,980 B1 | 10/2003 | Ziemer | |
| 7,059,995 B2* | 6/2006 | Stevenson | 475/284 |
| 7,247,119 B2* | 7/2007 | Andres | 475/275 |
| 7,300,383 B2* | 11/2007 | Nozaki et al. | 477/131 |
| 7,320,657 B2* | 1/2008 | Nozaki et al. | 475/119 |
| 7,373,933 B2* | 5/2008 | Kamada et al. | 123/568.21 |
| 7,393,299 B2* | 7/2008 | Inoue et al. | 475/123 |

(Continued)

FOREIGN PATENT DOCUMENTS

DE    199 49 507    4/2001

(Continued)

*Primary Examiner*—Ha D. Ho
(74) *Attorney, Agent, or Firm*—Davis & Bujold, P.L.L.C.

(57) ABSTRACT

A multi-step automatic gearbox comprising a drive shaft (AN), a driven shaft (AB), a double planetary front mounted gearset (VS), a main gearset (HS) which is embodied as a coupled planetary gearset comprising at least three non-coupled input elements and an output element, in addition to six shift elements (A to F) and closing takes place in pairs enabling at least eight forward gears to be shifted therein. One input element of the front mounted gearset is connected to the drive shaft. One output element of the front mounted gearset rotates at a rotational speed which is slower than the rotational speed of the input of the drive shaft. One element of the front mounted gearset is secured to a gearbox housing (GG). The fifth and sixth shifting elements (E, F) together form a component comprising a disk support (ZYLEF) for the fifth and sixth shifting element and for the fifth and sixth shifting element, respectively, a disk packet (500, 600) and a servodevice (510, 610) which is used to activate the respective disk packets.

25 Claims, 14 Drawing Sheets

U.S. PATENT DOCUMENTS

| | | |
|---|---|---|
| 7,452,303 B2 * | 11/2008 | Seo .................... 475/284 |
| 2002/0142880 A1 | 10/2002 | Hayabuchi et al. |
| 2002/0183154 A1 | 12/2002 | Ziemer |
| 2003/0083173 A1 | 5/2003 | Miyazaki et al. |
| 2004/0072648 A1 | 4/2004 | Dreibholz et al. |
| 2004/0116238 A1 | 6/2004 | Ziemer |
| 2005/0085332 A1 | 4/2005 | Ziemer |

FOREIGN PATENT DOCUMENTS

| | | |
|---|---|---|
| DE | 101 15 987 | 10/2002 |
| DE | 102 50 373 | 7/2003 |
| DE | 102 10 348 | 10/2003 |
| DE | 102 21 095 | 7/2004 |
| DE | 103 18 565 | 11/2004 |
| EP | 0 997 663 | 5/2000 |
| EP | 1 375 962 | 1/2004 |
| EP | 1 510 728 | 3/2005 |
| JP | 2001182785 | 7/2001 |
| JP | 2001 349395 | 12/2001 |
| JP | 2002 295 609 | 10/2002 |
| JP | 2002 323 098 | 11/2002 |
| WO | WO 03/087624 | 10/2003 |
| WO | WO 03/095865 | 11/2003 |
| WO | WO 2005/026579 | 3/2005 |
| WO | WO 2005/100819 | 10/2005 |

* cited by examiner

| Gear | Engaged shift elements |  |  |  |  |  |
|---|---|---|---|---|---|---|
| | A | B | C | D | E | F |
| 1 | • | | | • | | |
| 2 | • | | • | | | |
| 3 | • | • | | | | |
| 4 | • | | | | | • |
| 5 | • | | | | • | |
| 6 | | | | | • | • |
| 7 | | • | | | • | |
| 8 | | | • | | • | |
| R1 | | • | | • | | |
| R2 | | | | • | | • |

Fig. 1B
Prior Art

MULTI-STEP AUTOMATIC GEARBOX

This application is a national stage completion of PCT/EP2005/008585 filed Aug. 8, 2005, which claims priority from German Application Serial No. 10 2004 038 287.5 filed Aug. 6, 2004.

FIELD OF THE INVENTION

The invention concerns a multi-stage automatic transmission.

BACKGROUND OF THE INVENTION

Automatic transmissions with several gear ratios that can be engaged without range change are widely known. From U.S. Pat. No. 5,106,352 a 6-gear automatic transmission is known, in which a simple transfer planetary gearset is arranged co-axially with a two-carrier, four-shaft main gearset made as a Ravigneaux planetary gearset and five shift elements are provided. In this, the transfer planetary gearset is made as a non-shiftable step-down stage with a sun gear fixed to a transmission housing. The output speed of which is slower than the speed of a drive input shaft of the automatic transmission and can be transferred via two clutches to two different elements of the main gearset, and one of the two elements can additionally be fixed relative to the transmission housing by a first brake. The input element of the main gearset, which can optionally be connected with the output element of the transfer planetary gearset or fixed relative to the transmission housing, will be referred to in what follows as the "first input element of the main gearset". Correspondingly, the other input element of the main gearset will be called the "second input element of the main gearset" in what follows. The speed of the drive input shaft can be transferred by a third clutch to a third input element of the main gearset, and this third element can also be fixed relative to the transmission housing by a second brake. A fourth element of the main gearset forms the output element of the main gearset and is exclusively in fixed connection with a drive output shaft of the automatic transmission.

Several component arrangements alternative to this automatic transmission described in U.S. Pat. No. 5,106,352 are known, for example from U.S. Pat. No. 6,139,463 and DE 102 10 348 A1.

The unpublished German patent application DE 102 21 095.0 by the present Applicant describes developing the 6-gear automatic transmission known from U.S. Pat. No. 5,106,352, into a 7-gear automatic transmission. Compared with U.S. Pat. No. 5,106,352 the transfer planetary gearset is made as a simple, shiftable "positive" planetary gearset of double-planetary structure and an additional, sixth shift element is added. A carrier of the transfer planetary gearset forms the input element of the transfer planetary gearset in fixed connection with the drive input shaft of the automatic transmission. In contrast to U.S. Pat. No. 5,106,352 a sun gear of the transfer planetary gearset can be fixed relative to a transmission housing with the sixth shift element. Correspondingly, a ring gear of the transfer planetary gearset forms the output element of the transfer planetary gearset that can be connected with two different elements of the main gearset, and rotates at a speed slower than or equal to that of the drive input shaft. For this kinematic coupling of the individual gearset elements and shift elements, DE 102 21 095.0 discloses numerous different arrangement variants of the transmission components relative to one another.

JP 2001/182785 A describes further developing the 6-gear automatic transmission known from U.S. Pat. No. 5,106,352 into an 8-gear automatic transmission. Compared with U.S. Pat. No. 5,106,352, in this case the transfer planetary gearset is made as a simple, non-shifting "positive" planetary gearset of double-planetary structure and an additional, sixth shift element is added. A carrier of the transfer planetary gearset forms the input element of the transfer planetary gearset and is in fixed connection with the drive input shaft of the automatic transmission. A sun gear of the transfer planetary gearset is fixed relative to a transmission housing. Correspondingly, a ring gear of the transfer planetary gearset forms the output element of the transfer planetary gearset that can be connected with two different elements of the main gearset, and always rotates at a speed slower than or equal to that of the drive input shaft. Via the additional, sixth shift element compared with U.S. Pat. No. 5,106,352, the first input element of the main gearset—which can optionally be connected with the output element of the transfer planetary gearset or fixed relative to the transmission housing—can now optionally also be connected to the drive input shaft of the transmission. With regard to the spatial arrangement of the shift elements relative to one another and relative to the planetary gearsets, it is proposed in JP 2001/182785 A to arrange the two shift elements, by way of which the first and second input elements of the main gearset can be connected with the ring gear of the transfer planetary gearset, together with the additional, sixth shift element compared with U.S. Pat. No. 5,106,352, as a single structural group axially between the transfer planetary gearset and the main gearset. The (fifth) shift element already known from U.S. Pat. No. 5,106,352, by which the drive input shaft can be connected to the third input element of the main gearset, is arranged on the opposite side of the main gearset to this structural group, i.e., on the side of the main gearset facing away from the transfer planetary gearset. In addition, JP 2001/182785 A proposes to arrange the additional, sixth shift element compared with U.S. Pat. No. 5,106,352 within the structural group spatially radially over the shift element by way of which the first input element of the main gearset can be connected to the ring gear of the transfer planetary gearset.

In the unpublished German patent application DE 103 18 565.8 by the present applicant, an improved arrangement of the component of the 8-gear automatic transmission known from JP 2001/182785 A is described. In order to have to make only comparatively few design changes compared to the basic design of the 6-gear automatic transmission according to U.S. Pat. No. 5,106,352 upon which these variants are modelled, in DE 103 18 565.8 it is proposed to maintain the spatial position of the transfer planetary gearset, the Ravigneaux main gearset and the first five shift elements relative to one another in the transmission housing, known from the 6-gear automatic transmission, and to arrange the additional, sixth shift element compared with U.S. Pat. No. 5,106,352 in the transmission housing on the side of the transmission facing a drive engine, spatially between a transmission housing wall on the drive input side and a first shift element, by which the output element of the transfer planetary gearset can be connected with the second input element of the main gearset, but spatially also between the transmission housing wall on the drive input side and the transfer planetary gearset. The additional, sixth shift element compared with U.S. Pat. No. 5,106,352 is thus arranged on the side of the transfer planetary gearset facing away from the main gearset.

The purpose of the present invention is to further develop the multi-stage automatic transmission described in JP 2001/182785 A and DE 103 18 565.8 to include eight forward gear ratios, and to provide alternative arrangements of components for the planetary gearsets and the six shift elements.

SUMMARY OF THE INVENTION

The starting point for the invention is the transmission design described in JP 2001/182785 A or the unpublished German patent application DE 103 18 565.8 by the present Applicant, for a multi-stage automatic transmission with at least eight forward gear ratios, comprising a drive input shaft, a drive output shaft, a transfer gearset made as a double planetary gearset, a main gearset made as a coupled planetary gearset with at least three uncoupled input elements and an output element, and at least six shift elements. The selective engagement of two of the shift elements, at a time, a rotational speed of the drive input shaft can be transferred to the drive output shaft in such manner that to shift from one gear ratio to the next higher or lower gear ratio, only one of the shift elements, engaged at the time, is disengaged and one other shift element is engaged. The entire content of the disclosure of the unpublished German patent application DE 103 18 565.8 by the present Applicant is expressly incorporated by reference thereto as part of the disclosure of the present invention.

An input element of the transfer planetary gearset is permanently connected with the drive input shaft. An output element of the transfer planetary gearset always rotates at a speed slower than that of the drive input shaft. A third element of the transfer planetary gearset is fixed relative to a transmission housing. The output speed of the transfer planetary gearset can be transferred via two shift elements, to two different input elements of the main gearset. The rotational speed of the drive input shaft can also be transferred to two different input elements of the main gearset by two other shift elements. The output element of the main gearset is permanently connected with the drive output shaft.

In a preferred embodiment of this transmission, designed as an 8-gear automatic transmission, a (coupled) carrier of the transfer planetary gearset forms its input element and is permanently connected with the drive input shaft, a ring gear of the transfer planetary gearset forms the output element and can be connected with two different input elements of the main gearset, and a sun gear of the transfer planetary gearset forms the third element and is fixed relative to the transmission housing. The transfer and main gearsets are arranged co-axially with one another. The main gearset can be made as a two-carrier, four-shaft transmission having the structure of a "Ravigneaux planetary gearset", with a first sun gear as the first input element of the main gearset, which can optionally be connected with the ring gear of the transfer gearset, the drive input shaft or can be fixed relative to the transmission housing, a second sun gear as the second input element of the main gearset, which can be connected with the ring gear of the transfer gearset, a (coupled) carrier as the third input element of the main gearset, which can optionally be connected with the drive input shaft or fixed relative to the transmission housing, and with a ring gear as the output element of the main gearset, which is permanently connected with the drive output shaft. In this case:

an input element of the first shift element is connected to the output element of the transfer gearset;
an output element of the first shift element is connected to the second input element of the main gearset;
an input element of the second shift element is connected to the output element of the transfer gearset;
an output element of the second shift element is connected to the first input element of the main gearset;
an input element of the third shift element is connected to the transmission housing;
an output element of the third shift element is connected to the first input element of the main gearset;
an input element of the fourth shift element is connected to the transmission housing;
an output element of the fourth shift element is connected to the third input element of the main gearset;
an input element of the fifth shift element is connected to the drive input shaft;
an output element of the fifth shift element is connected to the third input element of the main gearset;
an input element of the sixth shift element is connected to the drive input shaft;
an output element of the sixth shift element is connected to the first input element of the main gearset, and
a the output element of the main gearset is permanently connected to the drive output shaft.

The main gearset can, however, also be made as a two-carrier, four-shaft transmission with two coupled, single carrier planetary gearsets such that, for example, the first input element of this main gearset, which can optionally be connected to the ring gear of the transfer gearset or fixed in relation to the transmission housing, is formed by a sun gear of the first of these two single carrier planetary gearsets of the main gearset and a carrier of the second of these two single carrier planetary gearsets of the main gearset connected with this first sun gear of the main gearset, and such that the second input element of this main gearset, which can be connected with the ring gear of the transfer gearset is formed by a sun gear of the second of the two single carrier planetary gearsets of the main gearset, and such that the third input element of the main gearset which can optionally be connected to the drive input shaft or fixed relative to the transmission housing, is formed by a carrier of the first of the two single carrier planetary gearsets of the main gearset and a ring gear of the second of the two single carrier planetary gearsets of the main gearset connected with this first carrier of the main gearset, and such that a ring gear of the first of the two single carrier planetary gearsets of the main gearset is permanently connected to the drive output shaft as the output element of this main gearset. In this case the interconnection of the input and output elements of the six shift elements to the three input elements of the main gearset corresponds to the interconnection described earlier for the example of the Ravigneaux main gearset.

The main gearset can, for example, also be made as a "three-carrier, five-shaft transmission" with three coupled single carrier planetary gearsets, or else as a reduced three-carrier, five-shaft transmission with three coupled single carrier planetary gearsets, in which at least two of these individual planetary gearsets are coupled to one another ("reduced") by a common carrier and a further common central gear (i.e., either via their sun gears or via their ring gears). Analogously, the main gearset can also be made for example as a "reduced four-carrier, six-shaft transmission", in which the principle four individual planetary gearsets, then present and coupled to one another, are combined in such manner that the main gearset comprises only two carriers. In contrast to the connections of the six shift elements to the input elements of a main gearset of the "two-carrier, four-shaft planetary transmission" type, in relation to the kinematic connection of the input and output elements of the third and sixth shift elements to the individual main gearset elements there are various possibilities, in which case:

the input element of the third shift element is connected to the transmission housing, the output element of third shift element is connected to the first input element of the main gearset or to an input element of the main gearset which is close to this first input element in the speed diagram, the input element of the sixth shift element is connected to the drive input shaft, the output element of the sixth shift element is connected to the first input element of the main gearset or to an input element of the main gearset which is close to this first input element in the speed diagram.

In all the design variants mentioned, in the first forward gear ratio, the first and fourth shift elements are engaged; in the second forward gear ratio, the first and third shift elements; in the third forward gear ratio, the first and second shift elements; in the fourth forward gear ratio, the first and sixth shift elements; in the fifth forward gear ratio, the first and fifth shift elements; in the sixth forward gear ratio, the fifth and sixth shift elements; in the seventh forward gear ratio, the second and fifth shift elements, and in the eighth forward gear ratio, the third and fifth shift elements are engaged. In the reverse gear ratio the fourth and, in addition, either the second or the sixth shift elements are engaged.

According to the invention it is now proposed that the fifth shift element, by way of which the drive input shaft of the transmission can be connected to the third input element of the main gearset, and the sixth shift element, by way of which the drive input shaft of the transmission can be connected to the first input element of the main gearset or to a fourth input element (close to this first input element of the main gearset in the speed diagram), form a structural group comprising a disk carrier common to the fifth and sixth shift elements, in each case a disk set for the fifth and sixth shift elements and in each case a servomechanism for the fifth and sixth shift elements to actuate the respective disk sets of the fifth and sixth shift elements. The disk carrier common to the fifth and sixth shift elements forms both the input element of the fifth shift element and the input element of the sixth shift element.

In a first advantageous embodiment of the structural group formed by the fifth and sixth shift elements, it is proposed that this structural group is arranged spatially at least mainly on the side of the transfer gearset facing away from the main gearset. The first shift element, by way of which the output element of the transfer gearset can be connected to the second input element of the main gearset, and the second shift element, by which the output element of the transfer gearset can be connected to the first input element of the main gearset, can be arranged at least mainly on the side of the transfer gearset opposite the structural group formed by the fifth and sixth shift elements, and the first shift element is then preferably arranged closer to the transfer gearset than the second shift element. With such a spatial arrangement of the first, second, fifth and sixth shift elements, on one hand, the output element of the sixth shift element connected with the first or second input element of the main gearset can completely overlap the transfer gearset and the first and second shift elements radially in the axial direction and, on the other hand, the output element of the fifth shift element connected with the third input element of the main gearset can also at least partially overlap the output element of the sixth shift element radially in the axial direction. In addition, with such a spatial arrangement of the first, second, fifth and sixth shift elements it is appropriate that the third shift element, by way of which the first input element of the main gearset or a fourth input element of the main gearset (close to this first input element of the main gearset in the speed scheme) can be fixed relative to the transmission housing, and/or the fourth shift element, by way of which the third input element of the main gearset can be fixed to the transmission housing, are arranged on the side of the transfer gearset opposite the structural group formed by the fifth and sixth shift elements.

In a second advantageous embodiment of the structural group formed by the fifth and sixth shift elements, it is proposed that the structural group is spatially arranged at least mainly in an area axially between the transfer gearset and the main gearset. The structural group comprising the fifth and sixth shift elements can then be arranged spatially at least partially radially under a disk set of the second shift element, so that the output element of the second shift element connected with the first input element of the main gearset at least partially overlaps the structural group of the fifth and sixth shift elements radially in the axial direction. The structural group of the fifth and sixth shift elements can also be spatially arranged at least partly radially under a disk set of the first shift element. With such a spatial arrangement of the first, second, fifth and sixth shift elements that it is expedient for the third and/or fourth shift elements to be arranged on the side of the main gearset opposite the transfer gearset.

In a third advantageous embodiment of the structural group formed by the fifth and sixth shift elements, it is proposed that this structural group be spatially arranged at least mainly on the side of the main gearset facing away from the transfer gearset. The first and second shift elements can then be arranged at least mainly on the side of the main gearset opposite the structural group of the fifth and sixth shift elements. With such a spatial arrangement of the fifth and sixth shift elements it is appropriate for the third and/or fourth shift elements to be arranged at least mainly on the same side of the main gearset on which the structural group of the fifth and sixth shift elements is also arranged.

In all these three designs of the structural group formed by the fifth and sixth shift elements, the disk set of the fifth shift element can optionally be arranged either on a larger diameter than the disk set of the sixth shift element (in this case spatially preferably at least partly radially over the disk set of the sixth shift element), or on a smaller diameter than the disk set of the sixth shift element (in this case spatially preferably at least partly radially under the disk set of the sixth shift element), or on a diameter at least similar to the disk set of the sixth shift element (in this case spatially preferably closer to the transfer gearset than the disk set of the sixth shift element).

BRIEF DESCRIPTION OF THE DRAWINGS

The invention will now be described, by way of example, with reference to the accompanying drawings in which all the comparable structural elements are given the same indexes. The Figures show:

FIG. 1B is a shift scheme for the transmission of FIG. 1A;

DETAILED DESCRIPTION OF THE INVENTION

Figure 1A:
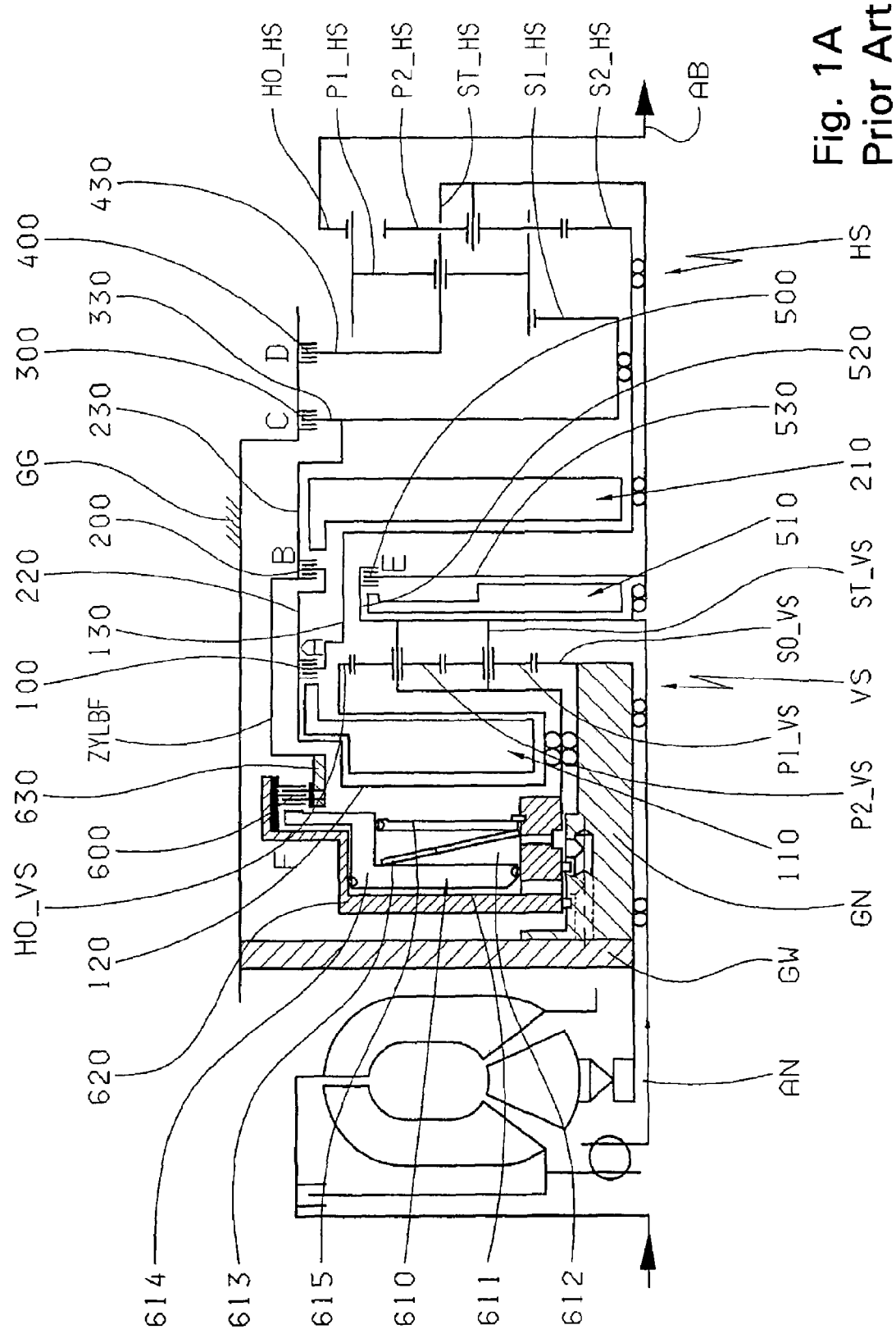
FIG. 1A is a transmission design according to the relevant prior art.

For a better understanding, the prior art upon which the invention is based will first be explained. FIG. 1A shows the transmission design of the relevant prior art according to DE 103 18 565.8, and FIG. 1B the corresponding shift scheme. In FIG. 1A, AN denotes a drive input shaft of the automatic transmission that is in active connection with a drive engine (not shown) of the automatic transmission, in the example shown, via a torque converter with a torsion damper and a converter bridging clutch. AB denotes a drive output shaft of the automatic transmission arranged co-axially with the drive input shaft AN, which is in active connection with at least one drive axle of the motor vehicle. Clearly, instead of the torque converter, a frictional clutch could be arranged as the starting element for the automatic transmission between the drive engine and the automatic transmission. The drive engine could also be connected to the drive input shaft AN of the transmission via a simple torsion damper, a dual-mass flywheel or a solid shaft, and in that case a frictional shift element would have to be located within the automatic transmission as the starting element of the transmission.

The automatic transmission comprises a transfer gearset VS and a main gearset HS arranged co-axially with (but not directly adjacent to) this transfer gearset VS. The transfer gearset VS is made as a positive planetary gearset of double planetary structure, with a ring gear wheel HO_VS, a sun gear wheel SO_VS, and a carrier ST_VS formed by two individual carriers, on which are mounted inner planetary gears P1_VS, which mesh with the sun gear SO_VS, and outer planetary gears P2_VS, which mesh with the inner planetary gears P1_VS and the ring gear HO_VS, so that they can rotate. This transfer gearset VS therefore operates as a non-shifting stepdown stage and produces an output rotational speed slower than the input rotational speed of the drive input shaft AN of the automatic transmission. For this, the sun gear SO_VS of the transfer gearset VS is fixed relative to a transmission housing GG and the carrier ST_VS is permanently connected to the drive input shaft AN. The ring gear HO_VS forms the output element of the transfer gearset VS and can be connected with individual input elements of the main gearset HS via two shift elements A, B.

The main gearset HS is made as a coupled two-carrier, four-shaft planetary gearset with three input elements not coupled to one another and one output element, in the structural form of a Ravigneaux gearset with two sun gears S1_HS and S2_HS, a ring gear HO_HS and a coupled carrier ST_HS, on which long planetary gears P1_HS, which mesh with the first sun gear S1_HS and the ring gear HO_HS, and short planetary gears P2_HS which mesh with the second sun gear S2_HS and the long planetary gears P1_HS, so as to rotate. In this, the first sun gear S1_HS forms the first input element of the main gearset HS, the second sun gear S2_HS the second input element of the main gearset HS, the coupled carrier ST_HS the third input element of the main gearset HS and the ring gear HO_HS the output element of the main gearset HS.

The automatic transmission has a total of six shift elements A to F. The shift elements A, B, E and F are clutches and the shift elements C and D are brakes. For this, the second sun gear S2_HS of the main gearset HS can be connected, via the first shift element A, with the ring gear HO_VS of the transfer gearset VS. Furthermore, the fourth sun gear S1_HS of the main gearset HS can be connected via the second shift element B, with the ring gear HO_VS of the transfer gearset VS, via the third shift element C it can be fixed to the transmission housing GG, and via the sixth shift element F it can be connected with the drive input shaft AN. In addition, the carrier ST_HS of the main gearset HS can be fixed to the transmission housing GG, via the fourth shift element D, and can be connected with the drive input shaft AN, via the fifth shift element E. As a result of this interconnection of the individual elements of the main gearset HS to the individual shift elements, the carrier ST_HS of the main gearset HS can also be connected with the first sun gear S1_HS of the main gearset HS by simultaneous engagement of the fifth and sixth shift elements E, F. The ring gear HO_HS of the main gearset HS is permanently and exclusively connected to the drive output shaft AB.

Figure 1C:
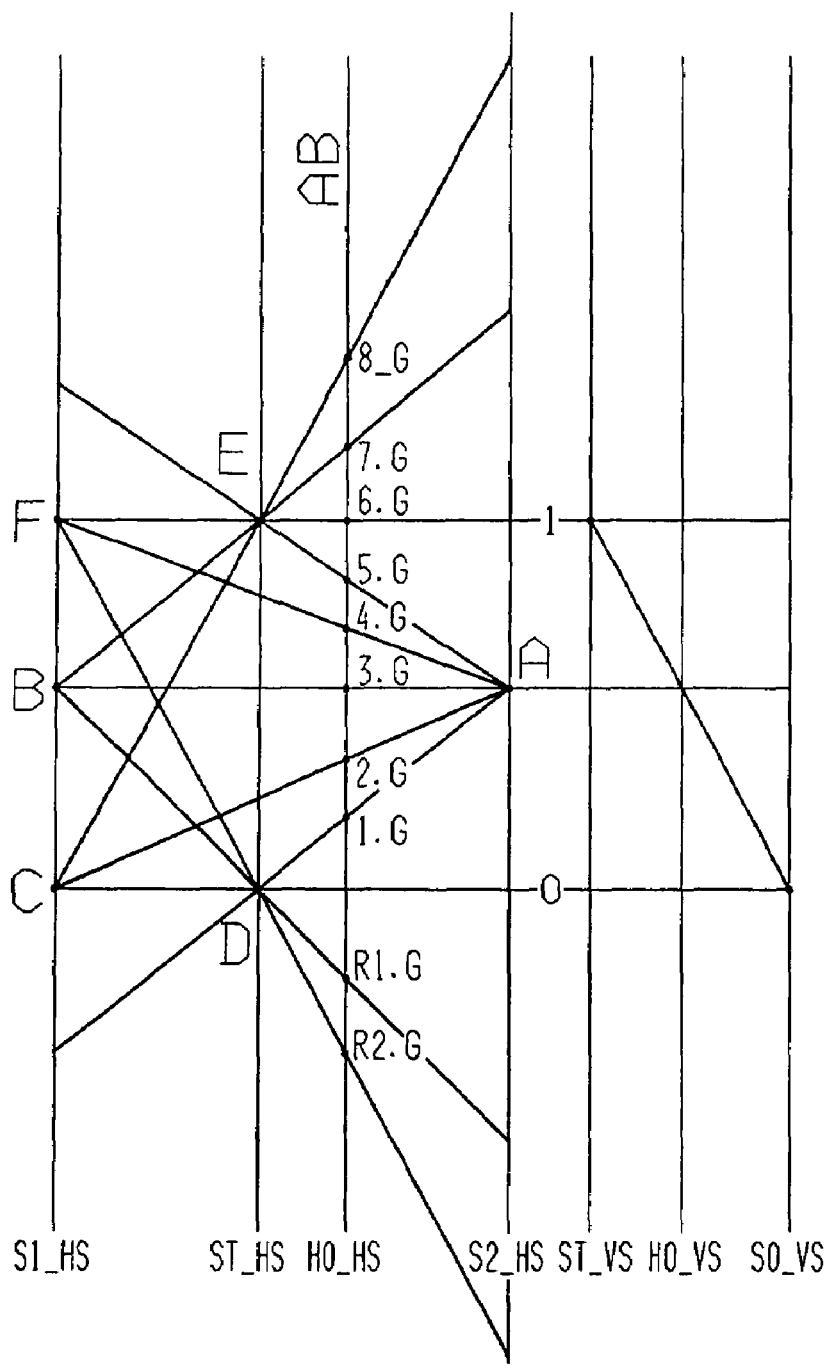
FIG. 1C is a speed diagram for the transmission of FIG. 1A.

FIG. 1B shows a shift scheme for the multi-stage automatic transmission represented in FIG. 1A. A total of eight forward gear ratios can be engaged without range shift, in such manner that to shift from one gear to the next higher or lower gear, of the shift elements engaged at the time in each gear only one shift element is disengaged and a different shift element is engaged. In first gear ratio "1", the clutch A and the brake D are engaged; in second gear ratio "2", the clutch A and brake C are engaged; in third gear ratio "3", the clutches A and B; in fourth gear ratio "4", the clutches A and F; in fifth gear ratio "5", the clutches A and E; in sixth gear ratio "6", the clutches E and F; in seventh gear ratio "7", the clutches B and E, and in eighth gear ratio "8", the brake C and the clutch E. In a first reverse gear ratio "R1", the clutch B and the brake D are engaged. A second reverse gear ratio "R2" can also be provided by engaging clutch F and brake D. FIG. 1C shows a speed diagram for the multi-stage automatic transmission of FIG. 1A.

Returning to FIG. 1A, the disk sets and individual input and output elements of the shift elements are indexed individually. Thus, the disk set of the first shift element A is indexed 100, the input element of the first shift element A is 120, the output element of first shift element A is 130, and a servomechanism for the actuation of the disk set 100 of the first shift element A is 110. Correspondingly, the disk set of the other shift elements B, C, D, E and F are indexed 200, 300, 400, 500 and 600, and the input elements of the other shift elements B, E and F are indexed 220, 520 and 620. Also correspondingly, the output elements of the other shift elements B, C, D, E and F are indexed 230, 330, 430, 530 and 630, and the servomechanisms of the other clutches B, E and F for actuating their respective disk sets 200, 500 and 600 are indexed 210, 510 and 610.

With regard to the spatial arrangement of the shift elements and gearsets relative to one another within the transmission housing indexed GG, DE 103 18 565.8 proposes the following: viewed axially, the fifth shift element E formed as a clutch, is arranged between the transfer gearset VS and the main gearset HS, axially directly adjacent to the transfer gearset VS. The second shift element B, also made as a clutch, is also arranged axially between the transfer gearset VS and the main gearset HS, with the disk set 200 of this clutch B spatially arranged approximately radially over the disk set 500 of the clutch E and the servomechanism 210 of the clutch B axially adjacent to the clutch E on its side facing away from the transfer gearset VS. Viewed axially in the direction of the main gearset HS, the clutch B is followed first by the third shift element C made as a brake, then by the fourth shift element D also made as a brake, and then by the main gearset HS. The disk set 100 of the first shift element A made as a clutch, is spatially arranged approximately over the transfer gearset VS. The servomechanism 110 of this clutch A is at least for the most part arranged on the side of the transfer gearset VS facing away from the main gearset HS. The sixth shift element F made as a clutch is arranged on the side of the servomechanism 110 of the clutch A facing away from the transfer gearset VS, when viewed axially is between the clutch A and a housing wall GW and is fixed to the housing on the drive side, i.e., on the side of the clutch A and the transfer gearset VS facing away from the main gearset HS.

As an example embodiment of a servomechanism of a shift element, the servomechanism 610 of the sixth shift element F is shown in more detail in FIG. 1A. This servomechanism 610 is arranged inside a cylindrical disk carrier, which forms the input element 620 of the clutch F and correspondingly rotates always at the rotational speed of the drive input shaft AN of the transmission. The servomechanism 610 has a pressure chamber 611 formed by a section of casing surface section of the disk carrier of clutch F and a piston 614 of the servomechanism 610. When this pressure chamber 611 is pressurized, the piston 614 moves against the force of a restoring element 613 of the servomechanism 610, here made, for example, as a cup spring, axially in the direction of the transfer gearset VS, so as to actuate or close the disk set 600 of the clutch F. For the preferably complete compensation of a dynamic pressure of the rotating pressure chamber 611, the servomechanism 610 also comprises a pressure equalization chamber 612 that can be filled with unpressurized lubricant and is formed by a surface of the piston 614 and a diaphragm plate 615. The input element 620 is mounted to rotate on a hub GN, which is fixed to the transmission housing and extends from the fixed housing wall GW axially into the inside space of the transmission housing GG, in the direction of the transfer gearset VS as far as the sun gear SO_VS of the transfer gearset VS and is in rotationally fixed connection with this sun gear SO_VS. Correspondingly, this hub GN fixed on the transmission housing also has channels for the supply of pressure medium and lubricant to the pressure chamber and pressure equalization chamber of the clutch F.

Figure 2:
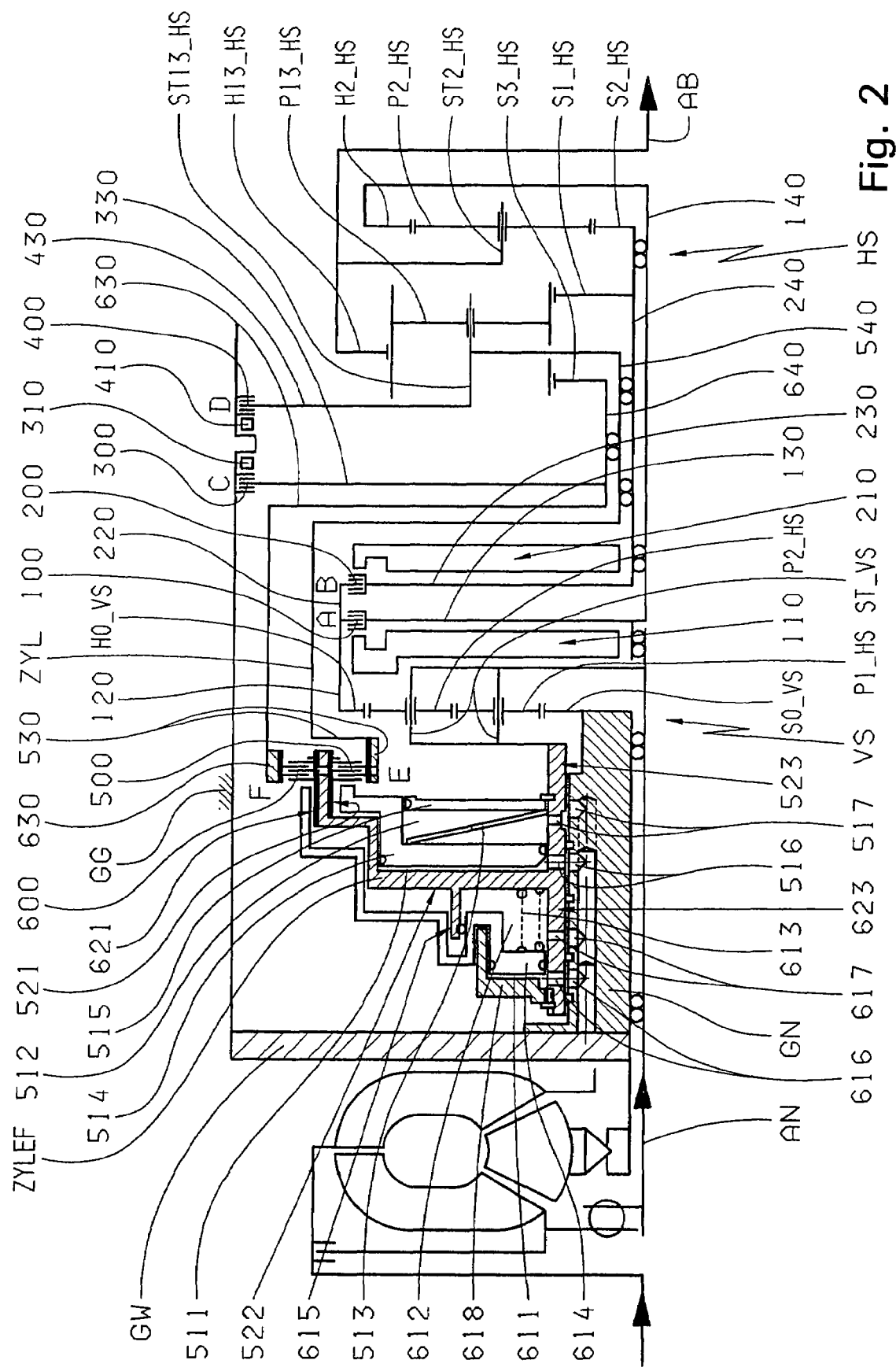
FIG. 2 is an example of a first transmission design according to the invention.

Referring to FIG. 2, a first example transmission design according to the present invention will now be explained. As in the relevant prior art, illustrated in FIG. 1A, the automatic transmission according to the invention comprises a drive input shaft AN, a drive output shaft AB, a transfer gearset VS made as a simple planetary gearset of double planetary structure, a multi-component main gearset HS formed of coupled planetary gear sets and six shift elements A to F. Preferably, by the selective engagement, in each case, of two of these six shift elements A to F a rotational speed of the drive input shaft AN can be transmitted, via the gearsets VS, HS in at least eight different forward gear ratios, such that for each gear shift from one gear ratio to the next higher or next lower gear ratio, only one of the previously engaged shift elements is disengaged and one shift element previously disengaged is engaged. The transfer gearset VS and the main gearset HS are arranged co-axially with one another. For example, the drive input shaft AN and the drive output shaft AB can be co-axial, but by comparatively simple modifications they can also extend axis-parallel or at an angle to one another. The kinematic coupling of the transfer gearset VS and the main gearset HS to the shift elements A to F and to the drive input and drive output shafts AN, AB is essentially the same as in FIG. 1A, so that the shift logic shown in FIG. 1B also applies for this first transmission according to the invention shown in FIG. 2.

In contrast to FIG. 1A, the design of the main gearset HS, which is now made for example as a "three-carrier, five-shaft planetary transmission is reduced to a two-carrier unit" with four mutually independent input elements and one output element. This "new" main gearset according to FIG. 2 is comprised of three planetary gearsets coupled with one another, such that in turn two of these three individual planetary gearsets are combined as a single planetary gearset, which is then coupled with the remaining individual planetary gearset. Thus, the "new" main gearset HS comprises three sun gears S1_HS, S2_HS and S3_HS, only two ring gears H13_HS and H2_HS, and only two carriers ST13_HS and ST2_HS with respective planetary gears P13_HS and P2_HS mounted to rotate on them. The second sun gear S2_HS, the second carrier ST2_HS, the short planetary gears P2_HS and the second ring gear H2_HS are associated with the remaining individual planetary gearset of the main gearset HS, such that these short planetary gears P2_HS mesh with the second sun gear S2_HS and the second ring gear H2_HS of the main gearset HS. The first and third sun gears S1_HS and S3_HS, the coupled carrier ST13_HS, the long planetary gears P13_HS and the coupled ring gear H13_HS are associated with the coupled planetary gearset of the main gearset HS, such that these long planetary gears P13_HS mesh with the two sun gears S1_HS and S3_HS and with the coupled ring gear H13_HS of the main gearset HS. In principle, the coupled planetary gearset of the main gearset HS can thus also be interpreted as an individual planetary gearset with a divided sun gear. This "division" of the sun gear into two individual sun gears S1_HS, S3_HS is, in turn, important, because it enables the kinematic coupling of the input element of the main gearset HS to the various shift elements A to F and the kinematic coupling of the output element of the main gearset HS to the drive output shaft AB of the transmission, as shown by the relevant prior art in FIG. 1A, but now in combination with the component arrangement according to the invention described below. Viewed spatially, the individual planetary gearset of the main gearset HS comprising the second sun gear S2_HS is arranged on the side of the main gearset HS remote from the transfer gearset, while in contrast the third sun gear S3_HS is arranged on the side of the main gearset HS close to the transfer gearset. The first sun gear S1_HS of the main gearset HS is thus arranged axially between the other sun gears S3_HS and S2_HS of the main gearset HS.

As in FIG. 1A, the transfer gearset VS comprises a sun gear SO_VS, a coupled carrier ST_VS with inner and outer planetary gears P1_VS, P2_VS mounted to rotate on it, and a ring gear HO_VS. The sun gear SO_VS is fixed to a hub GN which is rotationally fixed by a connection with the transmission housing GG and which extends from a housing wall GW, fixed to the transmission housing, into the inside space of the transmission toward the transfer gearset VS. Here, the housing wall GW forms an outer wall of the transmission, which on the one hand is arranged on the side of the transfer gearset VS facing away from the main gearset HS, and on the other hand faces a drive engine of the transmission not shown here for the sake of simplicity, which is in active connection with the drive input shaft AN. In the transmission design shown in FIG. 2, a torque-converter is arranged, for example, in the force flow direction between the drive engine and the drive input shaft AN. The coupled carrier ST_VS forms the input element of the transfer gearset VS, and a carrier plate of this carrier ST_VS facing the main gearset HS is in rotationally fixed connection with the drive input shaft AN of the transmission. The ring gear HO_VS forms the output element of the transfer gearset VS and produces a speed lower than the speed of the drive input shaft AN, rotating in the same direction as the drive input shaft AN. This output speed of the transfer gearset VS can be transmitted, via the first and second shift elements A and B, to two different input elements of the main gearset HS.

The first and second sun gears S1_HS, S2_HS of the main gearset HS are connected in a rotationally fixed manner with one another in a rotationally fixed manner, forming the first input element of the main gearset HS, and can be connected by the second shift element B here formed as a disk clutch, with the output element—i.e., the ring gear HO_VS—of the transfer gearset VS. The second ring gear H2_HS of the main gearset HS forms the second input element of the main gearset HS and can also be connected by way of the first shift element A, here made as a disk clutch, to the output element—i.e., the ring gear HO_VS—of the transfer gearset VS. The coupled carrier ST13_HS of the main gearset HS forms the third input element of the main gearset HS and, on one hand, can be connected by the fifth shift element E, here made as a disk clutch, to the drive input shaft AN while, on the other hand, it can also optionally be fixed relative to the transmission housing GG by the fourth shift element D, in this case for example, made as a disk brake. The third sun gear S3_HS of the main gearset HS forms the fourth input element of the main gearset HS and, on one hand, can be connected by the sixth shift element F, here made as a disk clutch, to the drive input shaft AN while, on the other hand, it can optionally also be fixed relative to the transmission housing GG by the third shift element C, here made for example, as a disk brake. The coupled ring gear H13_HS and the second carrier ST2_HS of the main gearset HS are connected in a rotationally fixed manner to one another, and form the output element of the main gearset HS connected with the drive output shaft AB of the transmission.

From the structure of the main gearset HS and its kinematic coupling to the individual shift elements A to F, it can be seen in FIG. 2 that in contrast to FIG. 1A, the fixed coupling between the output element 230, 330, 630 of the three shift elements B, C, F and the first input element of the main gearset HS (i.e., the sun gear S1_HS in FIG. 1A), existing in FIG. 1A, is replaced by a combination of a fixed coupling between the output elements 230 of clutch B and the first input element of the main gearset HS (i.e., in FIG. 2 the coupled sun gears S1_HS and S2_HS), a fixed coupling between the output element 330 of brake C and the output element 630 of clutch F, and the fourth input element of the main gearset HS (i.e., the sun gear S3_HS in FIG. 2, and a kinematic coupling between the first and fourth input elements of the main gearset HS by way of the long planetary gears P13_HS of the main gearset HS. Correspondingly, in a speed diagram of the transmission according to the invention shown in FIG. 2, the lines of the first and fourth input elements of the main gearset HS coincide. If it is provided in a modification of the main gearset HS that, otherwise than in the representation of FIG. 2, the long planetary gears P13_HS are made as stepped planetary gears, then in the speed diagram corresponding to this modification the lines of the first and fourth input elements of the modified main gearset will lie close to one another.

According to the invention, the fifth and sixth shift elements E, F form a structural group which is easily preassembled from the standpoint of production technology, which comprises a disk carrier ZYLEF common to the fifth and sixth shift elements E, F, in each case a disk set 500, 600 for the fifth and sixth shift elements E, F, and in each case a servomechanism 510, 610 for the fifth sixth shift elements E, F to actuate the respective disk sets 500, 600 of the fifth and sixth shift elements E, F. The disk carrier ZYLEF common to the two clutches E, F forms both the input element 520 of clutch E and the input element 620 of clutch F. As can be seen in FIG. 2 this structural group of the two clutches F, F is spatially arranged on the side of the transfer gearset VS facing away from the main gearset HS. Depending on the geometric design in particular of the transfer gearset VS and the disk sets 500, 600 of the clutches E, F, in another design of the structural group comprising the clutches E, F it can also be provided that, differing from the representation of FIG. 2, the disk sets 500, 600 of clutches E, F are arranged partly or even entirely in an area radially over the transfer gearset VS, but in this case, essential components of the structural group comprising the clutches E, F—in particular the servomechanisms 510, 610 of clutches E, F—will then still be arranged at least mainly on the side of the transfer gearset VS facing away from the main gearset HS.

As can also be seen in FIG. 2, the first shift element A, here formed as a disk clutch, and the second shift element B, here also formed as a disk clutch, are arranged on the side of the transfer gearset VS opposite the structural group of the two clutches E, F, spatially in an area axially between the transfer gearset VS and the main gearset HS. In this, the clutch A is arranged closer to the transfer gearset VS than the clutch B, such that the clutch A is, in this case, axially directly adjacent to the transfer gearset VS on its side facing the main gearset HS and the clutch B is axially directly adjacent to the clutch A on its side facing the main gearset HS. The disk sets 100, 200 of the two clutches A, B are arranged for example on the same diameter, which makes it possible to use similar disks for these clutches A, B. An input element 120 of clutch A is, for example, made as a cylindrical outer disk carrier, which is, on one hand, connected in a rotationally fixed manner at its end close to the transfer gearset to the ring gear HO_VS and, on the other end, has on its inside diameter, in the area of its end close to the main gearset, a suitable carrier profile to hold outer disks of the disk set 100 of clutch A made for example as externally toothed lining disks. An input element 220 of clutch B is for example also made as a cylindrical outer disk carrier and has at its inside diameter, in the area of its end near the main gearset, a suitable carrier profile to hold outer disks of the disk set 200 of clutch B for example made as externally toothed lining disks. At its end facing toward the clutch A and the transfer gearset VS, the input element 220 of clutch B is connected in a rotationally fixed manner with the input element 120 of clutch A, and is, therefore, connected by the input element 120 of clutch A to the ring gear HO_VS of the transfer gearset VS. Of course, these two input elements 120, 220 can also be made as one piece. The output elements 130, 230 of the two clutches A, B are correspondingly made as inner disk carriers and have at their outer diameter, in each case, a suitable carrier profile to hold inner disks of the respective disk sets 100 and 200 made for example as internally toothed steel disks. The largely disk-shaped inner disk carrier 130 of clutch A extends approximately parallel to the transfer gearset VS and is connected in a rotationally fixed manner in its hub area to a second sun shaft 140. This second sun shaft 140, in turn, extends axially from the clutch A toward the main gearset HS, passing along its course centrally, completely through the clutch B arranged next to clutch A and the main gearset HS, and being connected in a rotationally fixed manner on the side of the main gearset HS remote from the transfer gearset to the second ring gear H2_HS of the main gearset HS. As is known, the ring gear H2_HS forms the second input element of the main gearset HS. The also largely disk-shaped inner disk carrier 230 of clutch B extends approximately parallel to the inner disk carrier 130 of clutch A and is connected in a rotationally fixed manner in its hub area to a first sun shaft 240. This first sun shaft 240, in turn, extends axially from clutch B toward the main gearset HS, and along its course passes completely centrally through the third sun gear S3_HS of the main gearset HS close to the transfer gearset, enclosing the second sun shaft 140 radially, and is connected with the two coupled sun gears S1_HS and S2_HS of the main gearset HS. As is known, the coupled sun gears S1_HS, S2_HS form the first input element of the main gearset HS.

Shown only schematically in FIG. 2 for the sake of simplicity, are a servomechanism 110 for actuating the disk set 100 of clutch A and a servomechanism 210 for actuating the disk set 200 of clutch B. The servomechanism 110 of clutch A is arranged axially between the transfer gearset VS and the output element 130 or inner disk carrier of clutch A, and for example is mounted to move axially on this output element 130 or inner disk carrier of clutch A. When clutch A is engaged, this servomechanism 110 biases the disk set 100 associated with it axially in the direction of the main gearset HS. Expediently, the servomechanism 110 also has dynamic compensation means to compensate for a rotational pressure of its pressure chamber, which always rotates at the rotational speed of the second input element of the main gearset HS, i.e., here always at the rotational speed of the ring gear H2_HS. The servomechanism 210 of clutch B is here arranged for example on the side of the disk set 200 of clutch B opposite clutch A or the transfer gearset VS, and is mounted to move axially on the output element 230 or inner disk carrier of clutch B. When clutch B is engaged, this servomechanism 210 biases the disk set 200 associated with it axially in the direction of the transfer gearset VS. Expediently, the servomechanism 210 also has dynamic compensation to compensate for a rotational pressure of its pressure chamber which always rotates at the rotational speed of the first input element of the main gearset HS, i.e., here always at the rotational speed of the two sun gears S1_HS and S2_HS.

As can also be seen in FIG. 2 the third shift element C, here for example made as a disk brake, and the fourth shift element D, here for example also made as a disk brake, are both arranged on the side of the transfer gearset VS opposite the structural group with the two clutches E, F, spatially in an area axially between the clutch B and the main gearset HS. The brake D is arranged closer to the main gearset HS than the brake C. A servomechanism 310 for actuating a disk set 300 of brake C and a servomechanism 410 for actuating a disk set 400 of brake D are shown only schematically in FIG. 2 for the sake of simplicity, spatially arranged axially between the two disk sets 300 and 400 and mounted to move axially in corresponding piston spaces of the transmission housing GG. For example, the outer disk carriers of the two brakes C, D are integrated in the transmission housing GG. Of course, a person with knowledge of the subject can if necessary provide separate outer disk carriers for one of the two or for both brakes C, D, or even an outer disk carrier common to both brakes C, D, which is then connected in a rotationally fixed manner as a separate component to the transmission housing GG. Of course, a person with knowledge of the subject can if necessary integrate the servomechanism associated with whichever brake has a separate outer disk carrier, into the separate outer disk carrier. The output element 330 of brake C is here formed as a largely disk-shaped inner disk carrier, which extends spatially from the inside diameter of the disk set 300 of brake C radially inward and is connected in a rotationally fixed manner in its hub area with the third sun shaft 640. This third sun shaft 640 constitutes the mechanical connection of the output element 330 of brake C to the third sun gear S3_HS of the main gearset HS close to the transfer gearset VS, and encloses an axial section of the carrier shaft 540 radially. The sun shaft 640 and the sun gear S3_HS can also be made as one piece. The output element 430 of brake D is here also made as a largely disk-shaped inner disk carrier, extending spatially from the inside diameter of the disk set 400 of brake D radially inward to the carrier plate of the coupled carrier ST13_HS of the main gearset HS close to the transfer gearset, with which it is also in rotationally fixed manner. The inner disk carrier 430 and the carrier plate of the carrier ST13_HS close to the transfer gearset can also be made as one piece.

Of course, those with knowledge of the subject can if necessary also modify the spatial position of the two brakes C, D within the transmission housing, so that in contrast to the representation of FIG. 2, the brake C is arranged for example in the area of the housing wall GW and/or the brake D is arranged for example in an area radially over the main gearset HS.

Returning to the structural group formed by the two clutches E, F, it can be seen in FIG. 2 that the disk carrier ZYLEF common to the clutches E and F forms the input element for both clutches E, F, and is correspondingly connected in a rotationally fixed manner with the drive input shaft AN. For clutch E, the disk carrier ZYLEF is made as an outer disk carrier to hold outer disks of the disk set 500 of clutch E for example made as externally toothed steel disks, and for clutch F as an inner disk carrier to hold inner disks of the disk set 600 of clutch F for example made as internally toothed lining disks. Viewed spatially, the disk set 600 of clutch F is arranged in an area radially over the disk set 500 of clutch E, and the radially inner disk set 500 is arranged axially directly adjacent to the transfer gearset VS, in particular axially directly adjacent to the ring gear HO_VS of the transfer gearset VS. Of course, instead of the alternating arrangement of steel disks (with no friction lining) and lining disks, steel disks lined on one side with the friction lining can also be used, and in that case respective externally toothed lined steel disks and internally toothed lined steel disks have to be combined in alternation to form a disk set. Of course, instead of the proposed steel disks, disks made of carbon or carbon fibers or other suitable composite materials can be used. Geometrically, the disk carrier ZYLEF is made essentially in the shape of a pot, open in the direction of the transfer gearset VS. The outer disks of the disk set 500 of clutch E are arranged on the inside diameter of a stepped cylindrical section 521 of the disk carrier ZYLEF. An at least largely disk-shaped section (pot bottom) 522 of the disk carrier ZYLEF is connected to the cylindrical section 521 of the disk carrier ZYLEF and extends radially inward starting from the end of the cylindrical section 521 remote from the transfer gearset. A hub of the disk carrier ZYLEF is connected at the inside diameter of the pot bottom 522 of the disk carrier ZYLEF. Starting from the inside diameter of the pot bottom 522, a first hub section 523 of the disk carrier ZYLEF associated with the clutch E extends axially toward the transfer gearset VS. This first hub section 523 is connected radially fixed manner at its end near the transfer gearset to a carrier plate of the coupled carrier ST_VS of the transfer gearset VS remote from the main gearset, and the carrier plate of this carrier ST_VS near the main gearset is connected in a rotationally fixed manner to the drive input shaft AN. A second hub section 623 of the disk carrier ZYLEF associated with clutch F extends starting from the inside diameter of the disk-shaped section 522 or pot bottom of the disk carrier ZYLEF, axially in the direction opposite to the transfer gearset VS or axially in the direction of the housing wall GW. The hub of the disk carrier ZYLEF with its hub sections 523 and 623 is mounted to rotate on the hub GN fixed to the transmission housing, on which the sun gear SO_VS of the transfer gearset VS is also fixed. The outer diameter of the cylindrical section 521 of the disk carrier ZYLEF is indexed 621, as an indication that this section is also associated with the clutch F. In fact, a carrier profile is provided on this outer diameter to hold the inner disks of the disk set 600 of clutch F.

The servomechanism 510 of clutch E for actuating its disk set 500 comprises a pressure chamber 511, a pressure equalization chamber 512, a piston 514, a restoring element 513 and a diaphragm plate 515, and is arranged radially above the first hub section 523 of the disk carrier ZYLEF and completely inside a cylindrical space formed by the disk carrier ZYLEF, in particular its cylindrical section 521. The piston 514 is mounted to move axially on this disk carrier ZYLEF. Correspondingly, the servomechanism 510 always rotates at the rotational speed of the drive input shaft AN. To compensate for the rotational pressure of the rotating pressure chamber 511 of the servomechanism 510, dynamic compensation is provided by the pressure equalization chamber 512 that can be filled with unpressurized lubricant, this pressure equalization chamber 512, being positioned closer to the main gearset HS than the pressure chamber 511. The pressure chamber 511 is formed by a casing surface of the disk carrier ZYLEF and the piston 514. The pressure equalization chamber 512 is formed by the piston 514 and the diaphragm plate 515, which is fixed axially on the hub section 523 of the disk carrier ZYLEF and can move axially relative to the piston 515, sealed against lubricant. The piston 514 is pre-stressed axially against the hub section 523 of the disk carrier ZYLEF by the restoring element 513, here for example made as a cup spring. When the pressure chamber 511 is pressurized with pressure medium to engage the clutch E, the piston 514 moves axially in the direction of the transfer gearset VS or axially toward the main gearset HS and actuates the disk set 500 associated with it against the spring force of the restoring element 513.

Viewed spatially, the servomechanism 510 of clutch E is positioned closer to the main and transfer gearsets HS, VS than the servomechanism 610 of clutch F. This servomechanism 610 is arranged spatially at least mainly in an area radially over the second hub section 623 of the disk carrier ZYLEF and is also mounted to move axially on the disk carrier ZYLEF. Correspondingly, the servomechanism 610 also always rotates at the rotational speed of the drive input shaft AN. The servomechanism 610 of clutch F comprises a pressure chamber 611, a pressure equalization chamber 612, a piston 614 formed in sections having an irregular shape, a restoring element 613, a cylindrical diaphragm plate 615 and a pot-shaped support disk 618. To compensate for the rotational pressure of the rotating pressure chamber 611 of the servomechanism 610, dynamic compensation is provided by virtue of the pressure equalization chamber 612. For this, the cylindrical diaphragm plate 615 extends to a defined diameter above the hub section 623 starting from the disk-shaped section 522 of the disk carrier ZYLEF axially toward the housing wall GW, and can move axially relative to the axially adjacent piston 614, sealed against lubricant. Together with the casing surface section of the disk carrier ZYLEF located radially under the diaphragm plate 615 and facing the housing wall GW and the casing surface section of the piston 614 located radially under the diaphragm plate 615 and facing the transfer gearset VS, this diaphragm plate 615 forms the pressure equalization chamber 612. In the example shown, the diaphragm plate 615 and the disk carrier ZYLEF are made as one piece, but they can of course also be made as separate components.

The pressure equalization chamber 612 of the servomechanism 610 of clutch F and the pressure chambers 511 of the servomechanism 510 of clutch E are thus arranged immediately adjacent to one another and separated from one another only by a casing surface of the disk carrier ZYLEF common to the clutches E and F. The pressure chamber 611 of the servomechanism 610 is arranged on the side of the pressure equalization chamber 612 facing away from the pressure chamber 511 and the transfer gearset VS. This pressure chamber 611 is formed by the piston 615, the support disk 618 and an axial section of the hub 623. For this, the support disk 618 is fixed pressure-medium-tight on the hub 623. Radially above the section of the hub 623 which forms the pressure chamber 611, a cylindrical section of this pot-shaped support disk 618 extends axially in the direction of the pressure chamber 511 or axially toward the transfer gearset VS, and can move axially relative to a corresponding section of the piston 614, sealed against pressure medium. Along its further geometrical course the piston 614 extends at least largely along the outer contour of the support disk 618 and the upper area of the disk carrier ZYLEF, radially outward and axially in the direction of the main gearset HS, as far as the side of the disk set 600 of clutch F associated with it remote from the main gearset. The piston 614 is axially pre-stressed by the restoring element 613, here made for example as a spiral spring set of spiral springs kinematically connected in parallel and arranged in a circle, which is positioned axially between the disk-shaped section 622 of the disk carrier ZYLEF and the piston 614. When the pressure chamber 611 is pressurized with pressure medium to close the clutch F, the piston 614 moves axially in the direction of the transfer gearset VS or axially toward the main gearset HS, and biases the disk set 600 associated with it against the spring force of the restoring element 613.

The mounting of the disk carrier ZYLEF on the hub GN attached on the transmission housing enables comparatively simple pressure medium and lubricant supply to the two clutches E, F via corresponding ducts or holes which pass partly within the hub GN fixed to the transmission housing and partly within the hub of the disk carrier ZYLEF. The pressure medium supply to the pressure chamber 511 of the servomechanism 510 of clutch E is indexed 516, the lubricant supply to the pressure equalization chamber 512 of the servomechanism 510 of clutch E is indexed 517, the pressure medium supply to the pressure chamber 611 of the servomechanism 610 of clutch F is indexed 616, and the lubricant supply to the pressure equalization chamber 612 of the servomechanism 610 of clutch F is indexed 617.

The output element 530 of clutch E is made as an inner disk carrier which extends radially outward starting from the disk set 500 of clutch E, axially adjacent to the servomechanism 510 of clutch E, first axially toward the transfer gearset VS and just before the ring gear HO_VS of the transfer gearset VS, as far as just above the outer diameter of the ring gear HO_VS or just above the outer diameter of the input element 120 of clutch A connected with the ring gear HO_VS. In the area of its outer diameter, the inner disk carrier 530 of clutch E is connected in a rotationally fixed manner to a cylindrical connecting element ZYL. This cylindrical connecting element ZYL is formed as a pot, open in the direction of the clutch E, which radially completely encloses the transfer gearset VS, the clutch A axially adjacent to the transfer gearset VS, and the clutch B axially adjacent to the clutch A. A disk-shaped pot bottom of this connecting element ZYL is in this case axially adjacent the servomechanism 210 of clutch B, and is connected in a rotationally fixed manner to the carrier shaft 540 in the area of its inside diameter or its hub. In turn, the carrier shaft 540 extends axially toward the main gearset HS as far as an area between the third sun gear S3_HS near the transfer gearset and the spatially central first sun gear S1_HS of the main gearset HS, passing through the third sun gear S3_HS of the main gearset HS and being connected in a rotationally fixed manner to the coupled carrier ST13_HS of the main gearset HS. Accordingly, the cylindrical connecting element ZYL can also be formally associated with the output element 530 of the clutch E.

The output element 630 of clutch F is made as an outer disk carrier, geometrically in the form of a pot, open in the direction of the clutch F or the housing wall GW, which radially completely encloses the cylindrical connecting element ZYL described above. A disk-shaped pot bottom of this output element 630 or outer disk carrier of clutch F extends spatially axially between the pot bottom of the connecting element ZYL and the disk-shaped output element 330 or inner disk carrier of the brake C in the radial direction, and in its hub area is connected in a rotationally fixed manner to the third sun shaft 640, with which the output element 330 or inner disk carrier of brake C and the third sun gear S3_HS of the main gearset are also connected in a rotationally fixed manner. At the outer diameter of the pot bottom of the output element 630 or outer disk carrier of clutch F, is connected a cylindrical section of the output element 630 or outer disk carrier of clutch F, which extends axially in the direction of the housing wall GW as far as beyond the disk set 600 of clutch F. In the area of its end on the housing wall side, the cylindrical section of the output element or outer disk carrier 630 has on its inside diameter a suitable carrier profile to hold the externally toothed disks of the disk set 600 of clutch F.

Figure 3:
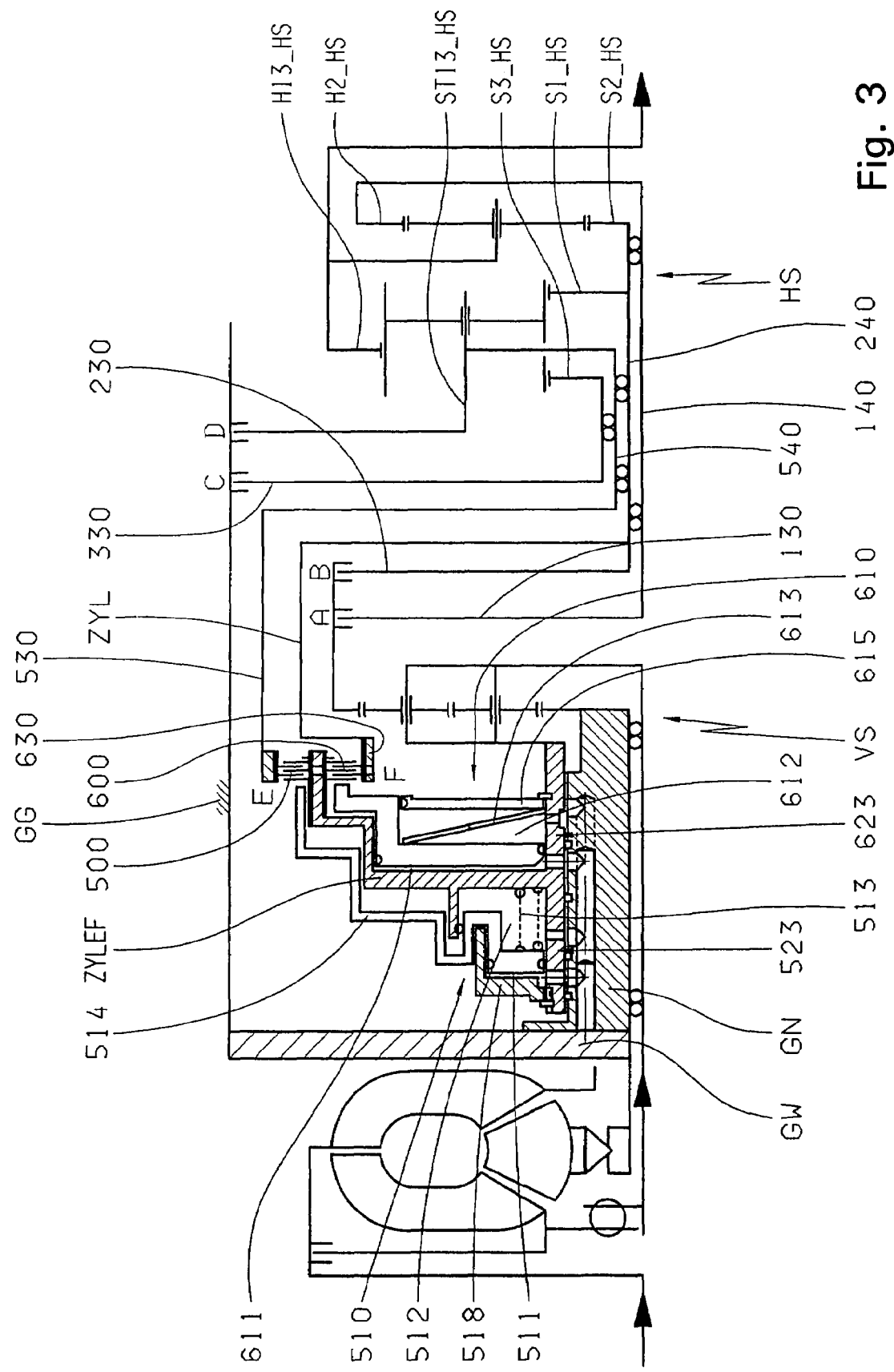
FIG. 3 is an example of a second transmission design according to the invention.

Referring to FIG. 3, a second example transmission design according to the present invention will now be described, which is based on the first transmission design according to the invention described in detail with reference to FIG. 2, but with an alternative design of the structural group of the fifth and sixth shift elements E, F compared with FIG. 2. The essential difference between the second transmission design according to the invention shown in FIG. 3 and the first transmission design according to the invention shown in FIG. 2, lies in the spatial arrangement of the disk sets 500, 600 of the two clutches E, F relative to one another. According to FIG. 3, the disk set 500 of clutch E is now arranged radially over the disk set 600 of clutch F. In accordance with this arrangement, the spatial position of the servomechanisms 510, 610 of the two clutches E, F is also adapted, such that the servomechanism 610 of clutch F is now closer to the transfer gearset VS than the servomechanism 510 of clutch E. From a direct comparison between FIG. 3 and FIG. 2 on which this example is based, it can easily be seen that the entire structural group comprising the two clutches E, F is made with identical components, only the component names having changed. All the structural elements of this structural group, associated by name with clutch E in FIG. 2, are now associated with clutch F in FIG. 3. Correspondingly, all the elements of this structural group associated by name with clutch F in FIG. 2, are now associated with clutch E in FIG. 3. Accordingly, the further description of the structural group with the disk carrier ZYLEF common to both clutches E, F, and the servomechanisms 510, 610 and disk sets 500, 600 of the two clutches E, F can be limited to pointing out the appropriately adapted indexes.

Since in FIG. 3, in contrast to FIG. 2, the disk set 500 of clutch E is arranged radially over the disk set 600 of clutch F, the output element 630 of clutch F, now made as an inner disk carrier, is also now arranged inside the output element 530 of clutch E. The output element 630 of clutch F overlaps the transfer gearset VS and the two clutches A and B radially in the axial direction, and is axially connected in a rotationally fixed manner to the first sun shaft 240 next to the output element 230 of clutch B. In turn, this first sun shaft 240 passes in its axial course through the third sun gear S3_HS of the main gearset HS close to the transfer gearset and radially encloses the second sun shaft 140, which forms the mechanical connection between the output element 130 of clutch A and the second input element of the main gearset HS formed by the ring gear H2_HS, being connected in a rotationally fixed manner with the two coupled sun gears S1_HS and S2_HS of the main gearset HS. The output element 530 of clutch E now formed as an outer disk carrier, radially overlaps the output element 630 or inner disk carrier of clutch F in the axial direction, and is connected by way of the carrier shaft 540 to the coupled carrier ST13_HS of the main gearset HS. Along its axial course this carrier shaft 540 passes through the third sun gear S3_HS of the main gearset HS close to the transfer gearset, and radially encloses the first sun shaft 240. In the area axially between the third sun gear S3_HS near the transfer gearset and the spatially central first sun gear S1_HS of the main gearset HS, the carrier shaft 540 is connected in a rotationally fixed manner to a carrier plate of the coupled carrier ST13_HS of the main gearset HS near the transfer gearset, and the carrier plate extends radially between the two sun gears S3_HS and S1_HS. The output element 330 of brake C is now connected in a rotationally fixed manner only to the third sun gear S3_HS of the main gearset HS.

From the structure of the main gearset HS shown in FIG. 3 and its kinematic coupling to the individual shift elements A to F, it can be seen, that in contrast to FIG. 1, in FIG. 3 the fixed coupling shown in FIG. 1 between the output elements 230, 330, 630 of the three shift elements B, C, F and the first input element of the main gearset HS (i.e., the sun gear S1_HS in FIG. 1) has been replaced by a combination of a fixed coupling between the output element 230 of clutch B and the output element 630 of clutch F and the first input element of the main gearset HS (i.e., in FIG. 3 the coupled sun gears S1_HS and S2_HS, a fixed coupling between the output element 330 of brake C and the fourth input element of the main gearset HS (i.e., the sun gear S3_HS in FIG. 3), and a kinematic coupling between the first and fourth input elements of the main gearset HS via the long planetary gears P13_HS of the main gearset HS. Correspondingly, the lines of the first and fourth input elements of the main gearset HS in a speed diagram of the transmission according to the invention shown in FIG. 3 coincide. If it is provided in a modification of the main gearset HS that the long planetary gears P13_HS, differing from those in the representation of FIG. 3, are formed as stepped planetary gears, then in the speed diagram associated with this modification the lines of the first and fourth input elements of the modified main gearset would lie close to one another.

Figure 4:
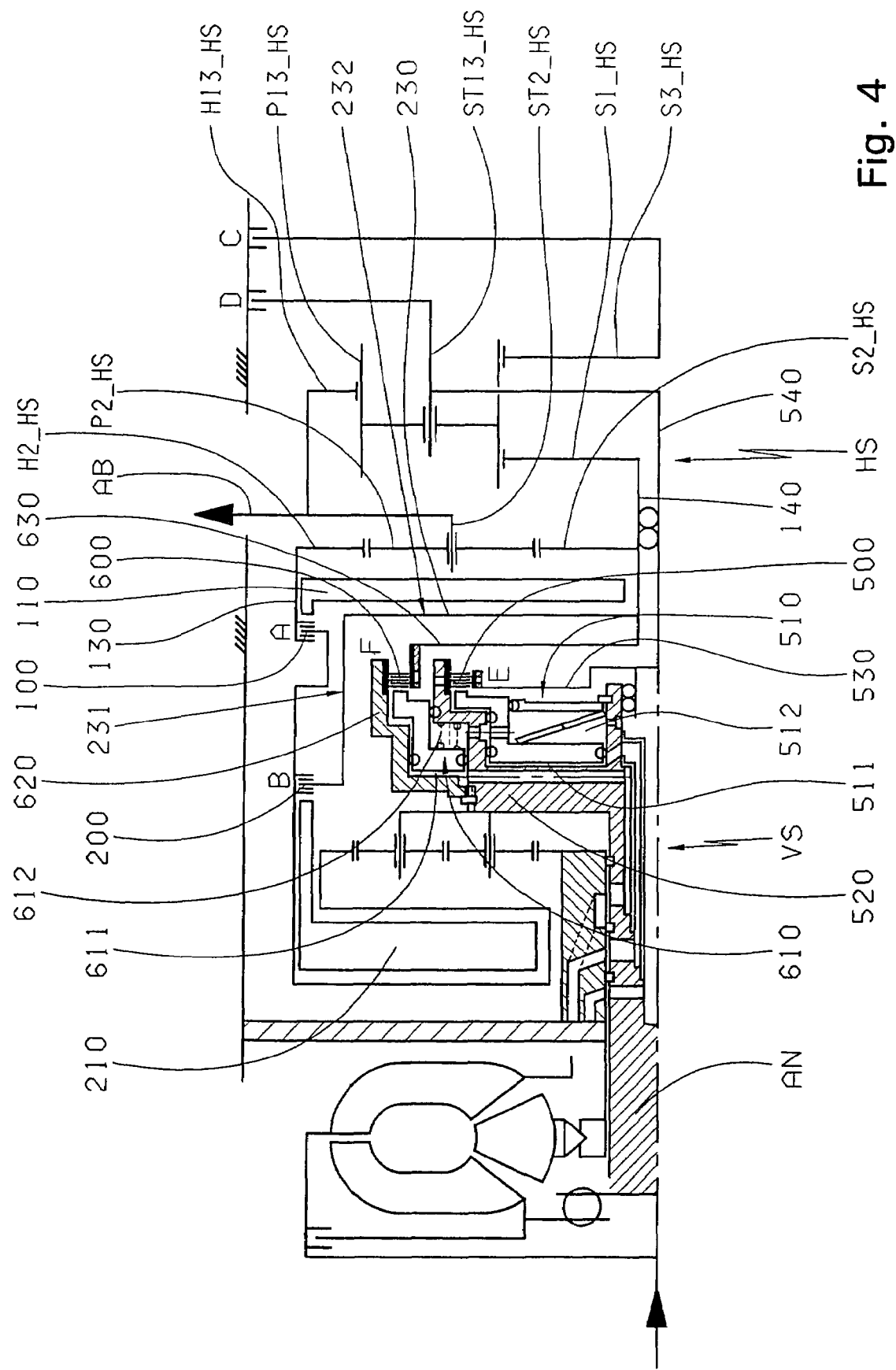
FIG. 4 is an example of a third transmission design according to the invention.

Referring to FIG. 4, a third example transmission design according to the present invention will now be explained, which is based on the first transmission design according to the invention described with reference to FIG. 2, but with a spatial arrangement of the structural group with the fifth and sixth shift elements E, F different from that shown in FIG. 2, and a different spatial arrangement of the third and fourth shift elements C, D in the transmission.

As in the relevant prior art, both the third shift element C and the fourth shift element D are made as brakes, both for example in the form of disk brakes. From FIG. 4 it is easy to see that the "new" arrangement of the two brakes C, D now on the side of the main gearset HS opposite the transfer gearset VS, in combination with the co-axial arrangement of the transfer gearset VS and the main gearset HS, enables the drive input and drive output shafts AN, AB of the transmission to be arranged axis-parallel or at an angle to one another, i.e., an arrangement necessary for example for a motor vehicle with front-wheel-drive and its drive engine arranged transversely to, or along the driving direction. For the sake of simplicity, a possibly necessary spur gear stage or bevel gear stage for connecting the output element of the main gearset HS to the transmission output is not shown in FIG. 4. Again, for the sake of simplicity, FIG. 4 also does not show a drive engine of the transmission actively connected to the drive input shaft AN, in this case for example arranged on the side of the transfer gearset VS facing away from the main gearset HS. Correspondingly, the drive input shaft AN passes almost entirely through the transmission in the axial direction, at least through all of the gearsets VS, HS. Accordingly, very little design modification is required in order to arrange the drive engine at the other end of the transmission, namely on the side of the main gearset HS remote from the transfer gearset.

The main gearset HS shown in FIG. 4, is made as in FIG. 2, as a "two-carrier, five-shaft planetary transmission reduced to a two-carrier unit", and is arranged co-axially next to the transfer gearset VS, made as a simple positive planetary gearset and co-axially with the drive input shaft AN. The main gearset HS has four input elements not connected with one another and one output element, and is formed as two mutually coupled individual planetary gearsets, one of these two individual planetary gearsets comprising a "divided sun gear". Correspondingly, as in FIG. 2 the main gearset HS comprises three sun gears S1_HS, S2_HS, S3_HS, a coupled first ring gear H13_HS, a second ring gear H2_HS, a coupled first carrier ST13_HS with long planetary gears P13_HS mounted to rotate on it, and a second carrier ST2_HS with short planetary gears P2_HS mounted to rotate on it. In accordance with the nomenclature of the connection of the input elements of the main gearset HS to the various shift elements A to F, the second of the two individual planetary gearsets of the main gearset HS comprises the second sun gear S2_HS, the second ring gear H2_HS and the second carrier ST2_HS with the short planetary gears P2_HS mounted to rotate on it, but in contrast to FIG. 2, it is now arranged close to the transfer gearset. The first individual planetary gearset of the main gearset HS comprises the first and third sun gears S1_HS, S3_HS, the coupled ring gear H13_HS and the coupled carrier ST13_HS with the long planetary gears P13_HS mounted to rotate on it, and in contrast to FIG. 2, is correspondingly now arranged on the side away from the transfer gearset. The short planetary gears P2_HS mesh with the second ring gear H2_HS and the second sun gear S2_HS, while the long planetary gears P13_HS mesh with the coupled ring gear H13_HS and the first and third sun gears S1_HS, S3_HS. As in FIG. 2, the long planetary gears P13_HS are for example not made as stepped planetaries, such that the two sun gears S1_HS and S3_HS of the main gearset HS in this case have identical numbers of teeth. Spatially, the first sun gear S1_HS of the main gearset HS is arranged axially between the second and third sun gears S2_HS, S3_HS of the main gearset HS, with the second sun gear S2_HS closer to the transfer gearset VS than the third sun gear S3_HS.

As in FIG. 2 the first and second sun gears S1_HS, S2_HS are firmly connected with one another and form the first input element of the main gearset HS, which is connected in a rotationally fixed manner with the output elements 230, 630 of the clutches B and F on the side of the main gearset HS close to the transfer gearset. The second ring gear H2_HS forms the second input element of the main gearset HS and is connected in a rotationally fixed manner to the output element 130 of clutch A. The coupled carrier ST13_HS forms the third input element of the main gearset HS and—correspondingly to the spatial position of the brake D—is connected in a rotationally fixed manner, on the side of the main gearset HS facing away from the transfer gearset VS, to the output element 430 of brake D, and—correspondingly to the spatial position of clutch E—is connected with the output element 530 of the clutch E via a radial passage extending axially between the first and third sun gears S1_HS, S3_HS. The third sun gear S3_HS forms the fourth input element of the main gearset HS and—correspondingly to the spatial position of the brake C—is connected radially fixed, on the side of the main gearset HS facing away from the transfer gearset, with the output element 330 of brake C. The coupled ring gear H13_HS and the second carrier ST2_HS are permanently connected with one another and form the output element of the main gearset HS connected to the drive output shaft AB of the transmission. In a speed diagram of the automatic transmission shown in FIG. 4, the lines of the first and fourth input elements of the main gearset HS coincide in accordance with the component and kinematic coupling of its three sun gears S1_HS, S2_HS, S3_HS described. In accordance with the kinematic coupling of the two brakes C, D to the main gearset HS, the brake D is arranged closer to the main gearset HS than the brake C, and in contrast to FIG. 2, the brake D is now arranged closer to the transfer gearset VS than the brake C.

According to the invention, the clutches E and F form a structural group easy to preassemble from the standpoint of production technology, which is now arranged in an area axially between the transfer gearset VS and the main gearset HS, and axially directly adjacent to the transfer gearset VS. This structural group comprises the input elements 520, 620 of clutches E and F, in this case for example both made as outer disk carriers, and for the two clutches E, F respective disk sets 500 and 600 and respective servomechanisms 510 and 610 to bias the disk sets 500 and 600 respectively associated with them.

In the example embodiment shown in FIG. 4, the clutch F is spatially arranged radially over the clutch E, in particular with the disk set 600 of clutch F spatially radially over the disk set 500 of clutch E. The input element or outer disk carrier 520 of clutch E is made geometrically in the form of a pot, open in the direction of the main gearset HS, whose hub is connected in a rotationally fixed manner to the drive input shaft AN and, in the example shown, even forms a common component with the drive input shaft AN. The servomechanism 510 of clutch E is arranged completely inside a cylindrical space formed by the outer disk carrier 520 of clutch E and is mounted to move axially on this outer disk carrier 520. Correspondingly, the servomechanism 510 always rotates at the rotational speed of the drive input shaft AN. To compensate for the rotational pressure of the rotating pressure chamber 511 of the servomechanism 510, dynamic pressure compensation is provided by the pressure equalization chamber 512, and the pressure chamber 511 is positioned closer to the transfer gearset VS than the pressure equalization chamber 512.

The input element or outer disk carrier 620 of clutch F is also formed geometrically as a pot, open in the direction of the main gearset HS, whose hub is connected in a rotationally fixed manner to the input element or outer disk carrier 520 of clutch E on the outer diameter thereof. The input element 620 of clutch F is thus connected with the drive input shaft AN via the input element 520 of clutch E. The servomechanism 610 of clutch F is arranged completely inside a cylindrical space formed by the outer disk carrier 620 of clutch F, and is mounted to move axially on this outer disk carrier 620. Correspondingly, the servomechanism 610 always rotates at the rotational speed of the drive input shaft AN. To compensate for the rotational pressure of the rotating pressure chamber 611 of the servomechanism 610, dynamic pressure compensation is provided by the pressure equalization chamber 612, and the pressure chamber 611 is arranged closer to the transfer gearset VS than the pressure equalization chamber 612.

Viewed spatially, the servomechanism 610 of the (radially outer) clutch F is arranged in an area radially over the servomechanism 510 of the (radially inner) clutch E. Correspondingly, the pressure chamber 611 of the (radially outer) servomechanism 610 of clutch F is at least approximately radially over the pressure chamber 511 of the (radially inner) servomechanism 510 of clutch E and the pressure equalization chamber 612 of the (radially outer) servomechanism 610 of clutch F is arranged at least approximately radially over the pressure equalization chamber 512 of the (radially inner) servomechanism 510 of clutch E. The pressure medium supply to the pressure chamber 511 and the lubricant supply to the pressure equalization chamber 512 of the servomechanism 510 of clutch E, which can be filled with unpressurized lubricant, pass partly within the hub of the input element (outer disk carrier) 520 of clutch E, and partly within the drive input shaft AN. The pressure medium supply to the pressure chamber 611 of the servomechanism 610 of the (radially outer) clutch F also passes partly inside the input element (outer disk carrier) 520 of the (radially inner) clutch E, and partly inside the drive input shaft AN. In this case, for example, the pressure equalization chamber 612 of the servomechanism 610 of clutch F is filled with unpressurized lubricant directly via the pressure equalization chamber 512 of the servomechanism 510 of clutch E. To engage the clutch E, the pressure chamber 511 of the servomechanism 510 is filled with pressure medium and then biases the disk set 500 of clutch E associated with it, axially in the direction of the main gearset HS. To engage the clutch F, the pressure chamber 611 of the servomechanism 610 is filled with pressure medium and then biases the disk set 600 of clutch F associated with it, axially in the direction of the main gearset HS.

In the example embodiment illustrated, the output elements 530, 630 of the two clutches E, F are both made as inner disk carriers. The inner disk carrier 530 of clutch E extends starting from the disk set 500 of clutch E, radially inward axially adjacent to the servomechanism 510 of clutch E, and is centrally connected in a rotationally fixed manner to the carrier shaft 540. This carrier shaft 540 extends axially toward the main gearset HS as far as the carrier plate of the (coupled) first carrier ST13_HS of the main gearset HS remote from the transfer gearset, thereby passing through the second and first sun gears S2_HS, S1_HS of the main gearset HS centrally in the axial direction, and is connected in a rotationally fixed manner in an area axially between the third and first sun gears S3_HS, S1_HS of the main gearset HS to the carrier plate of the carrier ST13_HS. Of course, the carrier plate of the carrier ST13_HS and the carrier shaft 540 can also be made as one piece. The inner disk carrier 630 of clutch F extends starting from the disk set 600 of clutch F, radially inward partly axially adjacent to the inner disk carrier 530 of clutch E as far as a diameter just above the carrier shaft 540, and is connected in a rotationally fixed manner in this hub area to a hub of the output element 230 of clutch B and, via the sun shaft 140, to the two sun gears S2_HS and S1_HS of the main gearset HS. Thus, the carrier shaft 540 passes centrally within the hub of the output element 630 of clutch F and the hub of the output element 230 of clutch B, and centrally within the sun shaft 140. If necessary, a person with knowledge of the field could also form the connection between the hubs of the two output elements 230, 630 by way of the sun shaft 140, or even make the two sun gears S2_HS, S1_HS as one piece.

In the example embodiment shown in FIG. 4, the disk sets 200 and 100 of the two clutches B and A are arranged spatially axially next to one another on at least similar diameters, in an area at least partly radially over the structural group formed by the two clutches E and F. The output element 230 of clutch B overlaps the structural group formed by the two clutches E, F radially in the axial direction, such that the cylindrical section 231 of this output element 230 extends at least mainly radially above the outer diameter of the input element (outer disk carrier) 620 of clutch F and thereby completely overlaps the clutch F, and such that the disk-shaped section 232 of this output element 230 extends at least largely parallel to the output element (inner disk carrier) 630 of clutch F. A servomechanism 210 of clutch B for actuating the disk set 200 of clutch B, illustrated only schematically for the sake of simplicity, can be arranged at least mainly on the side of the transfer gearset VS remote from the main gearset, as shown in FIG. 4, and always rotates at the rotational speed of the drive input shaft AN, biasing the disk sets 200 associated with it axially toward the main gearset HS when the clutch B is being engaged. A servomechanism 110 of clutch A for actuating the disk set 100 of clutch A, also illustrated only schematically for the sake of simplicity, can for example, as shown in FIG. 4, be arranged axially between the output element 230 of clutch B and the main gearset HS on the side of the disk set 100 facing toward the main gearset HS, and always rotates at the rotational speed of the first input element of the main gearset HS in this case for example formed by the coupled sun gears S1_HS, S2_HS, and biases the disk set 100 associated with it axially toward the transfer gearset VS when the clutch A is being engaged.

Figure 5:
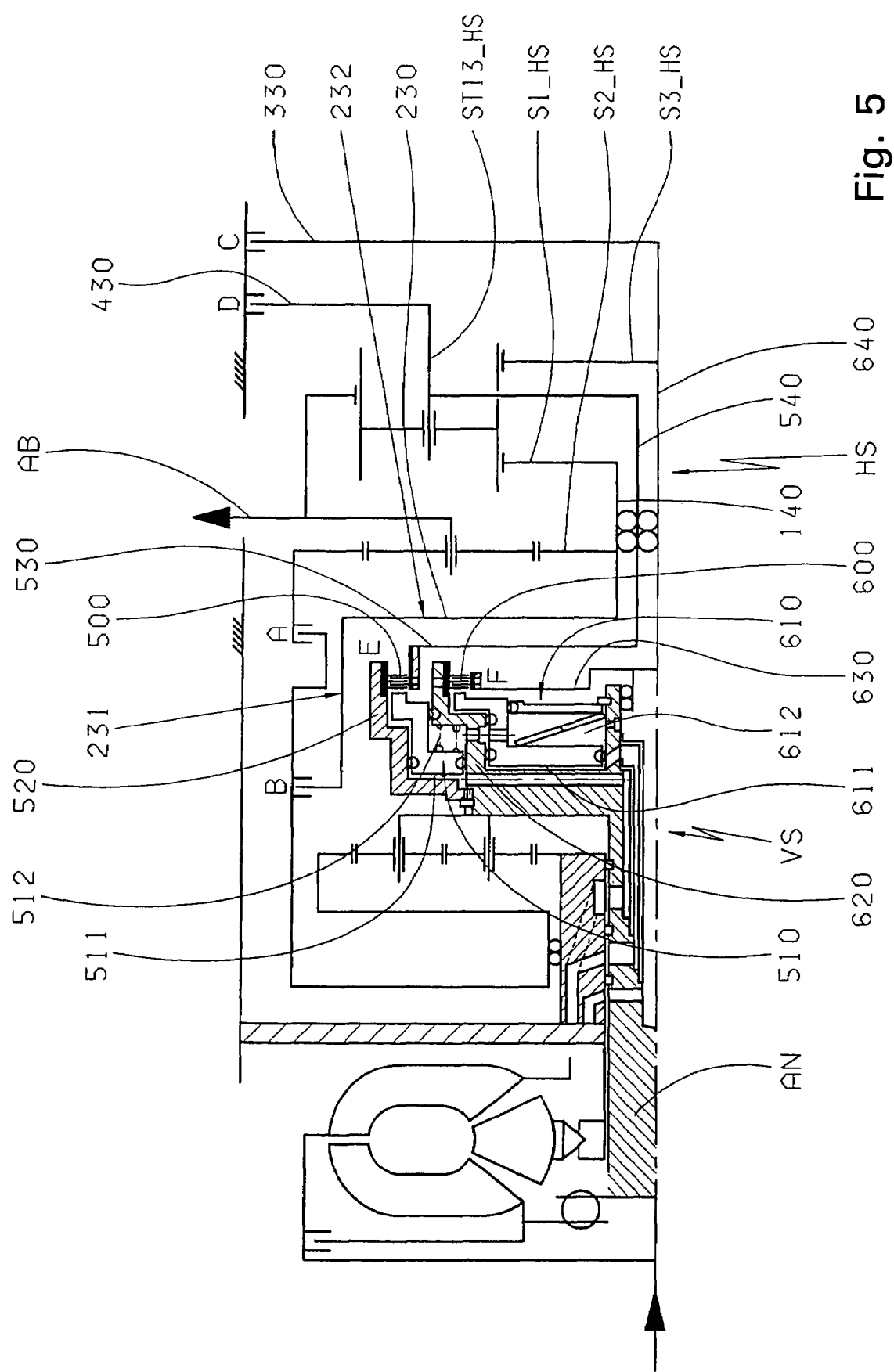
FIG. 5 is an example of a fourth transmission design according to the invention.

Referring to FIG. 5, a fourth example transmission design according to the present invention will now be explained, which is based on the transmission design according to the invention described in detail with reference to FIG. 4, but with an alternative design of the structural group comprising the fifth and sixth shift elements E, F compared to FIG. 4. As in FIG. 4, the clutches E and F form a structural group easily preassembled from the standpoint of production technology, and comprising the input elements 520, 620 of clutches E and F, in this case for example both made as outer disk carriers, the servomechanisms 510, 610 of the two clutches E and F, and the disk sets 500, 600 of the two clutches E and F. In contrast to FIG. 4, however, the clutch E is spatially arranged radially over the clutch F, in particular with the disk set 500 of clutch E radially over the disk set 600 of clutch F.

The input element or outer disk carrier 620 of clutch F is made geometrically in the form of a pot, open in the direction of the main gearset HS, whose hub is connected in a rotationally fixed manner with the drive input shaft AN, and in the example shown, is even formed as a common component with the drive input shaft AN. The servomechanism 610 of clutch F is arranged completely inside a cylindrical space formed by the outer disk carrier 620 of clutch F, and is mounted to move axially on this outer disk carrier 620. Correspondingly, the servomechanism 610 always rotates at the rotational speed of the drive input shaft AN. To compensate the rotational pressure of the rotating pressure chamber 611 of the servomechanism 610, dynamic pressure compensation is provided by the pressure equalization chamber 612, and the pressure chamber 611 is arranged closer to the transfer gearset VS than the pressure equalization chamber 612.

The input element or outer disk carrier 520 of clutch E is also made geometrically in the form of a pot, open toward the main gearset HS, whose hub is connected in a rotationally fixed manner to the input element or outer disk carrier 620 of clutch F at its outer diameter. The input element 520 of clutch E is thus connected to the drive input shaft AN via the input element 620 of clutch F. The servomechanism 510 of clutch E is arranged completely inside a cylindrical space formed by the outer disk carrier 520 of clutch E, and is mounted to move axially on this outer disk carrier 520. Correspondingly, the servomechanism 510 always rotates at the rotational speed of the drive input shaft AN. To compensate for the rotational pressure of the rotating pressure chamber 511 of the servomechanism 510, dynamic pressure compensation is provided by the pressure equalization chamber 512, and the pressure chamber 511 is arranged closer to the transfer gearset VS than the pressure equalization chamber 512.

Viewed spatially, the servomechanism 510 of the (radially outer) clutch E is arranged in an area radially over the servomechanism 610 of the (radially inner) clutch F. Correspondingly, the pressure chamber 511 of the (radially outer) servomechanism 510 of clutch E is at least partly radially over the pressure chamber 611 of the (radially inner) servomechanism 610 of clutch F, and the pressure equalization chamber 512 of the (radially outer) servomechanism 510 of clutch E is arranged at least approximately radially over the pressure equalization chamber 612 of the (radially inner) servomechanism 610 of clutch F. A pressure medium supply to the pressure chamber 611 and a lubricant supply to the pressure equalization chamber 612 of the servomechanism 610 of clutch F which can be filled with unpressurized lubricant, pass partly within the hub of the input element (outer disk carrier) 620 of clutch F and partly within the drive input shaft AN. A pressure medium supply to the pressure chamber 511 of the servomechanism 510 of the (radially outer) clutch E also passes partly within the input element (outer disk carrier) 620 of the (radially inner) clutch F and partly within the drive input shaft AN. The pressure equalization chamber 512 of the servomechanism 510 of clutch E is in this case for example filled with unpressurized lubricant directly via the pressure equalization chamber 612 of the servomechanism 610 of clutch F. To engage the clutch E, the pressure chamber 511 of the servomechanism 510 is filled with pressure medium, which biases the disk set 500 of clutch E associated with it, axially in the direction of the main gearset HS. To engage the clutch F, the pressure chamber 611 of the servomechanism 610 is filled with pressure medium, which biases the disk set 600 of clutch F associated with it, axially toward the main gearset HS.

Figure 8:
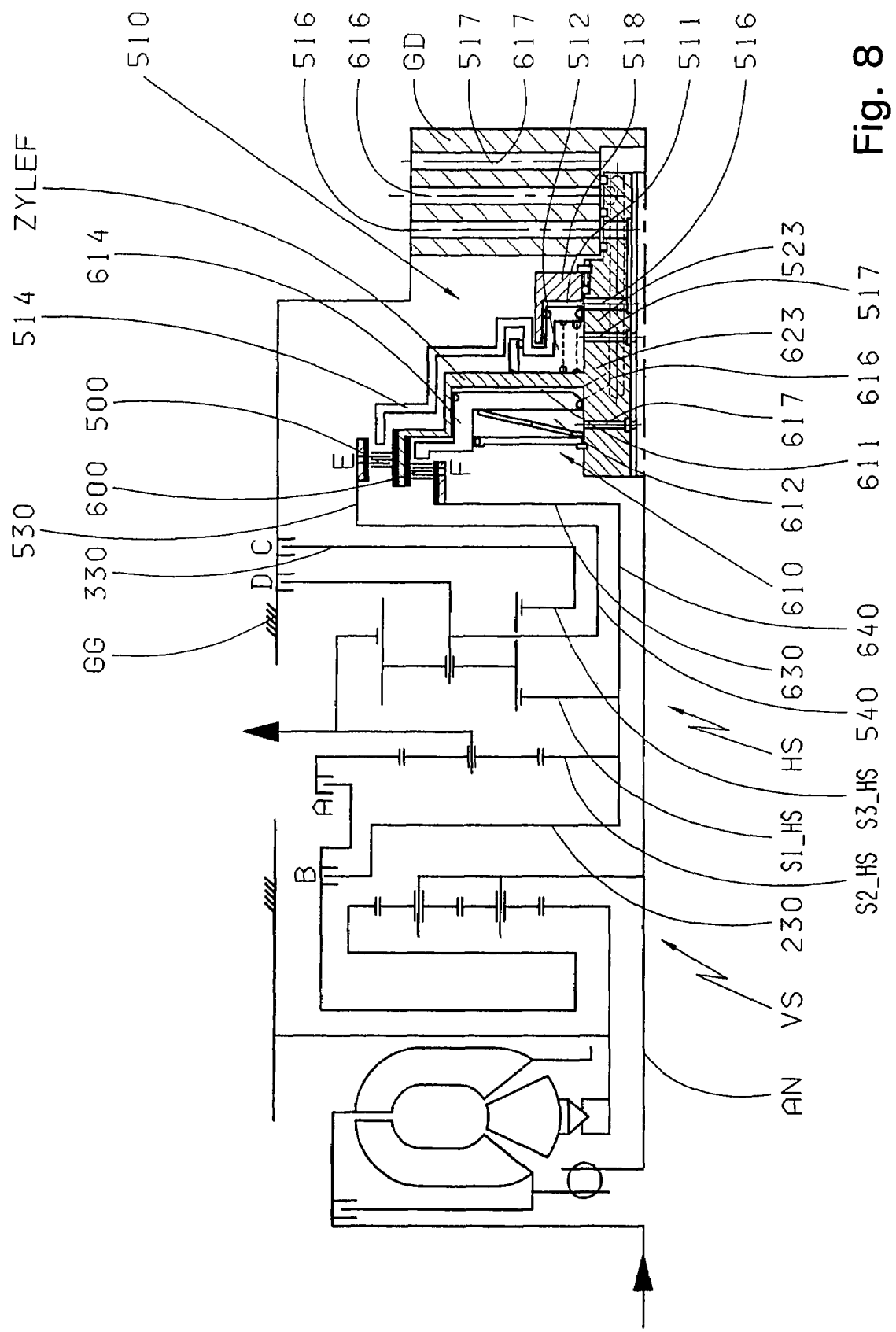
FIG. 8 is an example of a seventh transmission design according to the invention.

In accordance with the kinematic coupling between the output elements 230, 530, 630 of clutches B, E, F and the three sun gears S1_HS, S2_HS, S3_HS of the main gearset HS, the second sun gear S2_HS, as in FIG. 8, is arranged close to the transfer gearset, and the first sun gear S1_HS is arranged axially between the second and third sun gears S1_HS, S3_HS. In contrast to FIG. 8, the first input element of the main gearset HS formed by the sun gears S1_HS and S2_HS permanently connected with one another is now connected only to the output element 230 of clutch B, while in contrast, the fourth input element of the main gearset HS, formed by the third sun gear S3_HS, is now connected both to the output element 330 of brake C and to the output element 630 of clutch F. Naturally, the sun gears S2_HS and S3_HS connected to one another by the short sun shaft 140 can also if necessary be made as one piece.

In the example embodiment shown in FIG. 5 the output elements 530, 630 of the two clutches E, F are both made as inner disk carriers. The inner disk carrier 630 of clutch F extends starting from the disk set 600 of clutch F radially inward axially adjacent to the servomechanism 610 of clutch F, and is connected centrally and in a rotationally fixed manner to a third sun shaft 640. This third sun shaft 640 extends axially in the direction of the main gearset HS as far as at least its third sun gear S3_HS remote from the transfer gearset, thereby passing centrally at least through the second sun gear S2_HS (near the transfer gearset) and the (spatially central) first sun gear S1_HS of the main gearset HS in the axial direction, and being connected in a rotationally fixed manner to this third sun gear S3_HS. In principle, the third sun shaft 640 also passes centrally through this third sun gear S3_HS, since the output element 330 of the brake C is connected in a rotationally fixed manner on the side of the main gearset HS remote from the transfer gearset, with this third sun gear S3_HS or even with the third sun shaft 640. The inner disk carrier 530 of clutch E extends starting from the disk set 500 of clutch E, radially inward partly axially adjacent to the inner disk carrier 630 of clutch F, as far as a diameter just above the third sun shaft 640, and is connected in a rotationally fixed manner to the carrier shaft 540 in this hub area. This carrier shaft 540 in turn encloses the third sun shaft 640 radially, extends axially in the direction of the main gearset HS as far as the carrier plate or the coupled carrier ST13_HS of the main gearset HS remote from the transfer gearset, also passing through the second and first sun gears S2_HS, S1_HS of the main gearset HS in the axial direction, and is connected in a rotationally fixed manner in an area axially between the first and third sun gears S1_HS, S3_HS of the main gearset HS, to the carrier plate of the coupled carrier ST13_HS. Of course, the carrier plate of the carrier ST13_HS and the carrier shaft 540 can also be made as one piece.

In the example embodiment shown in FIG. 5, the disk sets 200 and 100 of the two clutches B and A are arranged spatially axially next to one another on at least similar diameters in an area at least partly radially over the structural group formed by the two clutches E and F. The output element 230 of clutch B radially overlaps the structural group formed by the two clutches E, F in the axial direction, such that the cylindrical section 231 of this output element 230 extends at least largely radially above the outer diameter of the input element (outer disk carrier) 520 of clutch E and thereby overlaps clutch E completely, and such that the disk-shaped section 232 of this output element 230 extends radially inward at least largely parallel to the output element (inner disk carrier) 530 of clutch E, as far as a diameter just above the carrier shaft 540. In its hub area the output element 230 of clutch B is connected in a rotationally fixed manner to the second sun gear S2_HS of the main gearset HS close to the transfer gearset, and by way of a sun shaft 140 also to the (spatially central) first sun gear S1_HS of the main gearset HS. Thus, the carrier shaft 540 passes centrally inside this hub of the output element 230 of clutch E and centrally inside the sun shaft 140.

In other respects, the fourth component arrangement according to the invention shown in FIG. 5 is essentially the same as the third component arrangement according to the invention shown in FIG. 4.

Figure 6:
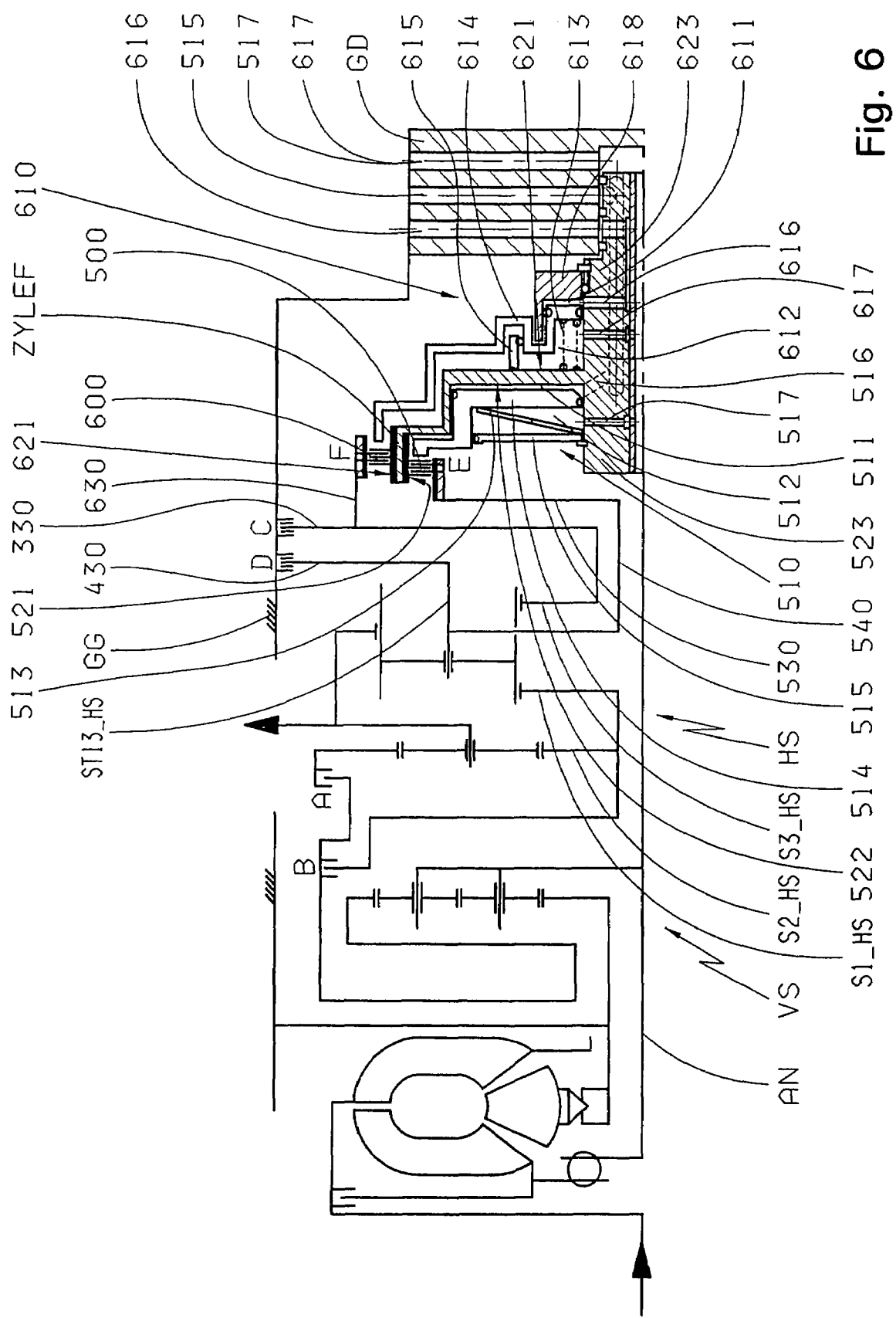
FIG. 6 is an example of a fifth transmission design according to the invention.

Referring to FIG. 6, a fifth example transmission design according to the present invention will now be explained, again based on the third transmission design according to the invention, described with reference to FIG. 4, but with a spatial arrangement of the structural group with the fifth and sixth shift elements E, F in the transmission different from that of FIG. 4. As before, the two clutches E and F form a structural group easily preassembled from the standpoint of production technology, which comprises a disk carrier ZYLEF common to the two clutches E and F, the servomechanisms 510, 610 of the two clutches E and F, and the disk sets 500, 600 of the two clutches E and F. In contrast to FIG. 4, this structural group consisting of the clutches E, F is now arranged on the side of the main gearset HS facing away from the transfer gearset VS. The planetary gearset of the main gearset HS with the divided sun gear (i.e., the two sun gears S1_HS and S2_HS) now faces toward the structural group consisting of clutches E and F, with the sun gear S3_HS of the main gearset HS axially adjacent to the structural group. Correspondingly the other, individual planetary gearset of the main gearset HS faces with its sun gear S2_HS toward the transfer gearset VS.

The disk carrier ZYLEF common to the clutches E and F forms the input element of both clutches E, F and is correspondingly connected in a rotationally fixed manner with the drive input shaft AN. For clutch E, the disk carrier ZYLEF is made as an outer disk carrier to hold outer disks of the disk set 500 of clutch E, and for the clutch F as an inner disk carrier to hold inner disks of the disk set 600 of clutch F. The disk set 600 of clutch F is arranged spatially in an area radially over the disk set 500 of clutch E. Geometrically, the disk carrier ZYLEF is made essentially in the form of a pot, open in the direction of the main gearset HS, with a stepped cylindrical section 521 on whose inner diameter the outer disks of the disk set 500 of clutch E are arranged, with an at least mainly disk-shaped section (pot bottom) 522 which extends radially inward starting from the end of the cylindrical section 521 remote from the main gearset, with a first hub section 523 associated with the clutch E, which extends axially starting from the inner diameter of the pot bottom 522 toward the main gearset HS and is connected at its end close to the main gearset to the drive input shaft AN, and with a second hub section 623 associated with the clutch F, which extends starting from the inner diameter of the pot bottom 522 axially in the direction opposite the main gearset HS and is mounted to rotate at its end remote from the main gearset on a housing cover GD connected in a rotationally fixed manner with the transmission housing GG. The outer diameter of the cylindrical section 521 is indexed 621 in order to indicate that this section is also associated with the clutch F. Namely, a carrier profile is provided on this outer diameter to hold the inner disks of the disk set 600 of the clutch F.

The servomechanism 510 of clutch E for actuating its disk set 500 comprises a pressure chamber 511, a pressure equalization chamber 512, a piston 514, a restoring element 513 and a diaphragm plate 515, and is arranged radially above the first hub section 523 of the disk carrier ZYLEF completely inside a cylindrical space formed by the disk carrier ZYLEF, in particular by its cylindrical section 521. The piston 514 is mounted to move axially on this disk carrier ZYLEF. Correspondingly, the servomechanism 510 always rotates at the rotational speed of the drive input shaft AN. To compensate for the rotational pressure of the rotating pressure chamber 511 of the servomechanism 510, dynamic compensation is provided by the pressure equalization chamber 512 which can be filled with unpressurized lubricant, this pressure equalization chamber 512 being arranged closer to the main gearset HS than the pressure chamber 511. The pressure chamber 511 is formed by a casing surface of the disk carrier ZYLEF and the piston 514. The pressure equalization chamber 512 is formed by the piston 514 and the diaphragm plate 515, which is fixed axially on the hub section 523 of the disk carrier ZYLEF, can move axially relative to the piston 515, and is sealed against lubricant. The piston 514 is pre-stressed axially against the hub section 523 of the disk carrier ZYLEF by the restoring element 513, here formed for example as a cup spring. When the pressure chamber 511 is pressurized with pressure medium to engage the clutch E, the piston 514 moves axially toward the main gearset HS and biases the disk set 500 associated with it against the spring force of the restoring element 513.

Viewed spatially, the servomechanism 510 of clutch E is arranged closer to the transfer and main gearsets VS, HS than the servomechanism 610 of clutch F. The servomechanism 610 is spatially arranged at least mainly in an area radially over the second hub section 623 of the disk carrier ZYLEF and is also mounted to move axially on the disk carrier ZYLEF. Correspondingly, the servomechanism 610 also always rotates at the rotational speed of the drive input shaft AN. The servomechanism 610 of clutch F comprises a pressure chamber 611, a pressure equalization chamber 612, a piston 614 formed in sections in an irregular shape, a restoring element 613, a cylindrical diaphragm plate 615 and a pot-shaped support disk 618. To compensate for the rotational pressure of the rotating pressure chamber 611 of the servomechanism 610, dynamic pressure compensation is provided by the pressure equalization chamber 612. For this, the cylindrical diaphragm plate 615, sealed against lubricant, is fixed on the disk-shaped section 522 of the disk carrier ZYLEF (by welding in the example shown), and is able to move axially relative to the adjacent piston 614 while sealed against lubricant, and together with the casing surface 621 of the disk carrier ZYLEF located radially under the diaphragm plate 615 and the casing surface of the piston 614 located radially under the diaphragm plate 615, forms the pressure equalization chamber 612. The pressure equalization chamber 612 of the servomechanism 610 of clutch F and the pressure chamber 511 of the servomechanism 510 of clutch E are thus arranged directly adjacent to one another and only separated from one another by a casing surface of the disk carrier ZYLEF common to the clutches E and F. The pressure chamber 611 of the servomechanism 610 is arranged on the side of the pressure equalization chamber 612 facing away from the main gearset HS and from the pressure chamber 511. This pressure chamber 611 is formed by the piston 615, the support disk 618, and an axial section of the hub 623. For this, the support disk 618 is fixed and sealed against pressure medium on the hub 623. Radially above the section of the hub 623 that forms the pressure chamber 612, there extends a cylindrical section of the pot-shaped support disk 618 axially in the direction of the main gearset HS (or axially toward the pressure chamber 511, being sealed against pressure medium and able to move axially relative to a corresponding section of the piston 614. In its further geometrical course the piston 614 extends radially outward at least largely along the outer contour of the support disk 618 and the upper area of the disk carrier ZYLEF, and axially in the direction of the main gearset HS as far as the side of the disk set 600 of clutch F associated with it and remote from the main gearset. The piston 614 is pre-stressed by the restoring element 613, here for example made as a spiral spring set arranged axially between the disk-shaped disk carrier section 621 and the piston 614. When the pressure chamber 611 is pressurized with pressure medium to engage the clutch F, the piston 614 moves axially toward the main gearset HS and biases the disk set 600 associated with it against the spring force of the restoring element 613.

The mounting of the disk carrier ZYLEF on the housing cover GD fixed on the transmission housing enables comparatively simply designed pressure medium and lubricant supply to the two clutches E, F via corresponding ducts or holes which pass partly within the housing cover GD and partly within the hub of the disk carrier ZYLEF. The pressure medium supply to the pressure chamber 511 of the servomechanism 510 of clutch E is indexed 516, the lubricant supply to the pressure equalization chamber 512 of the servomechanism 510 of clutch E is indexed 517, the pressure medium supply to the pressure chamber 611 of the servomechanism 610 of clutch F is indexed 616, and the lubricant supply to the pressure equalization chamber 612 of the servomechanism 610 of clutch F is indexed 617.

Apart from details of the pressure medium and lubricant supply to the two clutches E, F shown in FIG. 6, the component design of the structural group formed by the two clutches E, F, with the disk carrier ZYLEF common to the clutches E, F, the servomechanisms 510, 610 and the disk sets 500, 600 of the two clutches E, F thus corresponds essentially with the component design of this structural group comprising the two clutches E, F illustrated in FIG. 2.

The output element 530 of clutch E is made as an inner disk carrier which extends starting from the disk set 500 of clutch E axially adjacent to the servomechanism 510 of clutch E and radially inward as far as just above the drive input shaft AN, and is connected in a rotationally fixed manner in its hub area with the carrier shaft 540. This carrier shaft 540 extends axially in the direction of the transfer gearset VS as far as an area between the third sun gear S3_HS (remote from the transfer gearset) and the (spatially central) first sun gear S1_HS of the main gearset, passing through the third sun gear S3_HS of the main gearset HS centrally in the axial direction. In the area axially between the sun gears S3_HS and S1_HS the carrier shaft 540 is connected in a rotationally fixed manner to the carrier plate of the coupled carrier ST13_HS of the main gearset HS remote from the transfer gearset, and the carrier plate of the carrier ST13_HS is also connected in a rotationally fixed manner to the output element 430 of the brake D arranged close to the main gearset.

The output element 630 of clutch F is made as an outer disk carrier which extends radially inward, starting from the disk set 600 of clutch F axially adjacent to the output element (or inner disk carrier) 530 of clutch E, as far as just above the carrier shaft 540, and is connected in a rotationally fixed manner in its hub area to the third sun gear S3_HS of the main gearset HS (remote from the transfer gearset). The output element 330 of brake C, also kinematically coupled to the third sun gear S3_HS of the main gearset HS, is in this case connected in a rotationally fixed manner to this outer disk carrier 630, here for example in the area of the outer diameter of the outer disk carrier 630 of clutch F, with the brake C arranged for example directly axially next to the brake D on its side remote from the main gearset.

In other respects, the component arrangement shown in FIG. 6 corresponds essentially to the arrangement already illustrated in FIG. 4.

Of course, the component arrangement described with reference to FIG. 6 can also be combined with a different type of main gearset. A corresponding example of this will now be explained with reference to a sixth transmission design according to the invention shown in FIG. 7. Here, the main gearset HS is a three-carrier, four-shaft planetary gearset reduced to a two-carrier planetary gearset, now comprising three sun gears S1_HS, S2_HS, and S3_HS, three ring gears H1_HS, H2_HS and H3_HS, a coupled carrier ST13_HS with planetary gears P1_HS and P3_HS mounted to rotate on it, and a simple carrier ST2_HS with planetary gears P2_HS mounted to rotate on it. In this, the sun gear S1_HS, the ring gear H1_HS and the planetary gears P1_HS that mesh with this sun gear S1_HS and ring gear H1_HS are associated with the first of the three individual planetary gearsets of the main gearset HS. The sun gear S2_HS, the ring gear H2_HS and the planetary gears P2_HS that mesh with this sun gear S2_HS and ring gear H2_HS are associated with the second of the individual planetary gearsets of the main gearset HS. Finally, the sun gear S3_HS, the ring gear H3_HS and the planetary gears P3_HS that mesh with this sun gear S3_HS and ring gear H3_HS are associated with the third of the three individual planetary gearsets of the main gearset HS. Viewed spatially, the first of the three individual planetary gearsets of the main gearset HS is again arranged axially between the second of the three individual planetary gearsets of the main gearset HS close to the transfer gearset and the third of the three individual planetary gearsets of the main gearset HS is arranged remote from the transfer gearset. The two sun gears S2_HS and S1_HS are in fixed connection with one another. A permanent connection is provided as a further kinematic coupling of the main gearset HS, between the (simple) carrier ST2_HS and the two ring gears H1_HS and H3_HS.

Figure 7:
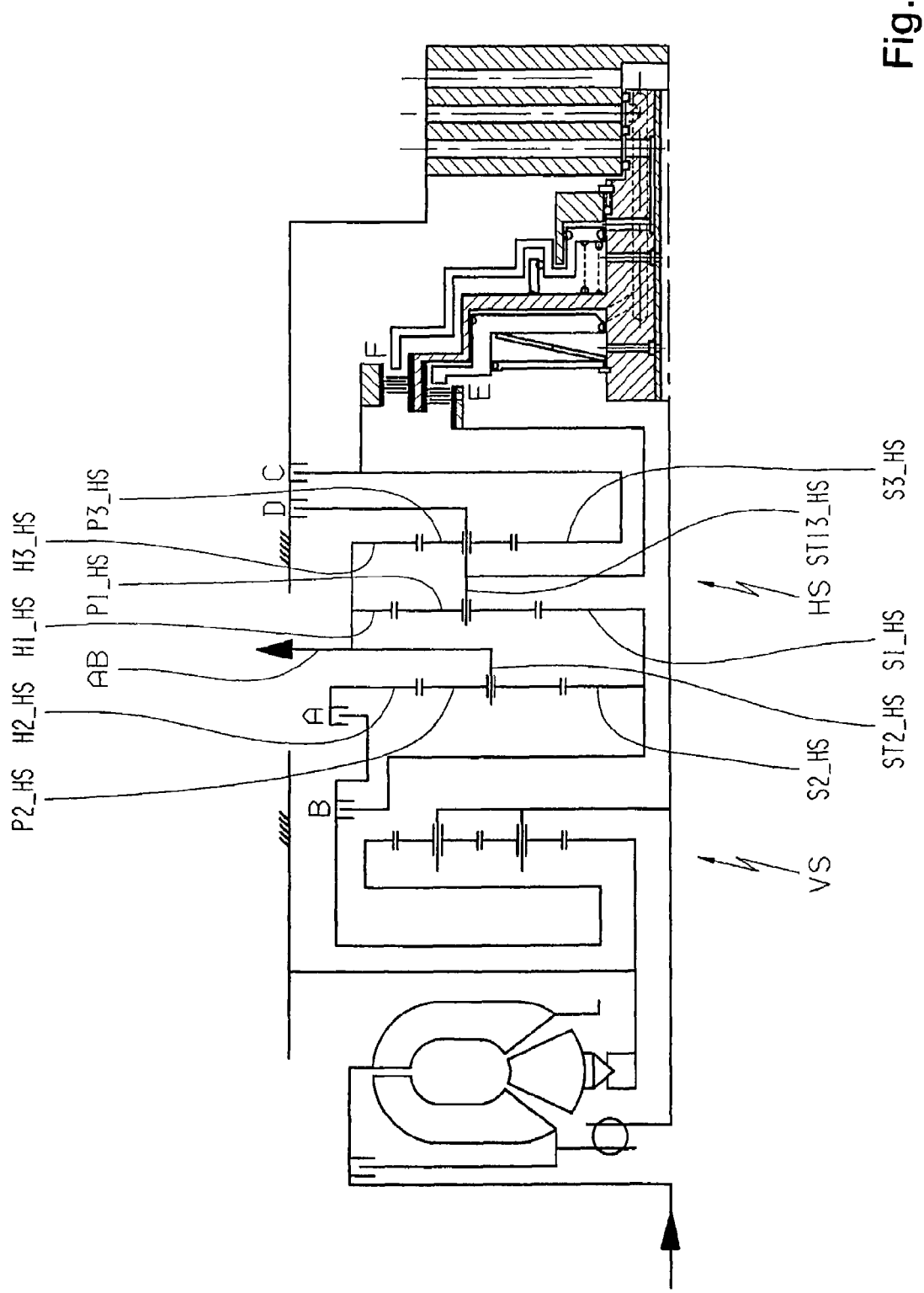
FIG. 7 is an example of a sixth transmission design according to the invention.

In a modification of the main gearset HS shown in FIG. 7, it can for example also be provided that the two planetary gears P1_HS and P3_HS of the main gearset HS mounted to rotate on the coupled carrier ST13_HS are combined to form a stepped planetary gear, and in that case one of the ring gears H1_HS, H3_HS of the main gearset HS connected with the drive output shaft AB in FIG. 7, can be omitted.

Referring to FIG. 8 a seventh example transmission design according to the present invention will now be explained, which is based on the fifth transmission design according to the invention previously described with reference to FIG. 6, but differs from the latter, essentially only in the design of the structural group formed by the two clutches E and F. As before, this structural group is arranged on the side of the main gearset HS facing away from the transfer gearset VS, and comprises a disk carrier ZYLEF common to the two clutches E and F, the servomechanisms 510, 610 of the two clutches E and F, and their two disk sets 500, 600. For both clutches E and F this disk carrier ZYLEF forms their input element and is accordingly connected in a rotationally fixed manner to the drive input shaft AN.

As can be seen in FIG. 8, the disk set 600 of clutch F is now spatially arranged radially under the disk set 500 of clutch E. Correspondingly, the disk carrier ZYLEF is formed for clutch F as an outer disk carrier to hold externally toothed disks of the (now radially inner) disk set 600 of this clutch F, and for clutch E as an inner disk carrier to hold internally toothed disks of the (now radially outer) disk set 500 of clutch E. Accordingly, the spatial position of the servomechanisms 510, 610 of the two clutches E, F is now exchanged compared with FIG. 61 and the servomechanism 610 of clutch F is now closer to the main gearset HS than the servomechanism 510 of clutch E. Thus, the previously described design of these servomechanisms 510, 610 with reference to FIG. 6 is the same, and there is therefore no need to describe them again in detail here. To avoid misunderstandings, only the different and new indexes will be explicitly commented upon here. Thus, in FIG. 8 the hub section of the disk carrier ZYLEF—now associated with clutch F—close to the main gearset is indexed 623 and the hub section of the disk carrier ZYLEF—now associated with clutch E—remote from the main gearset is indexed 523. To form the pressure chamber 511 of the servomechanism 510 of clutch E, a support disk 518 is provided, which is fixed and sealed against pressure medium on the hub section 523 remote from the main gearset, and can move axially, sealed against pressure medium, relative to a piston 514 of this servomechanism 510 formed in sections in an irregular shape. In contrast to FIG. 6, the pressure chamber 611 of the servomechanism 610 of clutch F and the pressure equalization chamber 512 of the servomechanism 510 of clutch E are now arranged directly adjacent to one another and only separated from one another by a casing surface of the disk carrier ZYLEF.

As can also be seen from FIG. 8, the output element 630 of clutch F, in contrast to FIG. 6, is now formed as an inner disk carrier which extends starting from the radially inner disk set 600 of the structural group formed of clutches E and F, axially adjacent to the servomechanism 610 of clutch F, radially inward as far as just above the drive input shaft AN, and is connected in a rotationally fixed manner in its hub area with a third sun shaft 640. This third sun shaft 640 overlaps the drive input shaft AN radially and extends axially in the direction of the transfer gearset VS, passing completely and centrally through the main gearset HS in the axial direction. The third sun shaft 640 is connected in a rotationally fixed manner on the one hand also with the (spatially central) first sun gear S1_HS and the second sun gear S2_HS (close to the transfer gearset) of the main gearset HS, and on the other hand also (spatially in an area axially between the transfer gearset VS and the main gearset HS) with the output element 230 of clutch B. The output element 330 of brake C is connected in a rotationally fixed manner directly to the third sun gear S3_HS of the main gearset HS (remote from the transfer gearset), in the example shown partly axially directly adjacent to the main gearset HS.

In contrast to FIG. 6, the output element 530 of the clutch E in FIG. 8 is now made as an outer disk carrier. Starting from the radially outer disk set 500 of the structural group comprising the clutches E and F, this outer disk carrier 530 of clutch E extends partly at least largely parallel and axially between the output element (inner disk carrier) 630 of clutch F and the output element 330 of brake C, radially inward as far as a diameter just above the third sun shaft 640. In its hub area the inner disk carrier 530 of clutch E is, in turn, connected in a rotationally fixed manner to the carrier shaft 540, which encloses the third sun shaft 640 radially. As in FIG. 6, the carrier shaft 540 passes through the third sun gear S3_HS of the main gearset HS (remote from the transfer gearset) in the axial direction and, in the area axially between the sun gears S3_HS and S1_HS, is connected in a rotationally fixed manner to the carrier plate of the coupled carrier ST13_HS of the main gearset HS (remote from the transfer gearset).

In other respects, the component arrangement shown in FIG. 8 corresponds to the arrangement already shown in FIG. 6.

Figure 9:
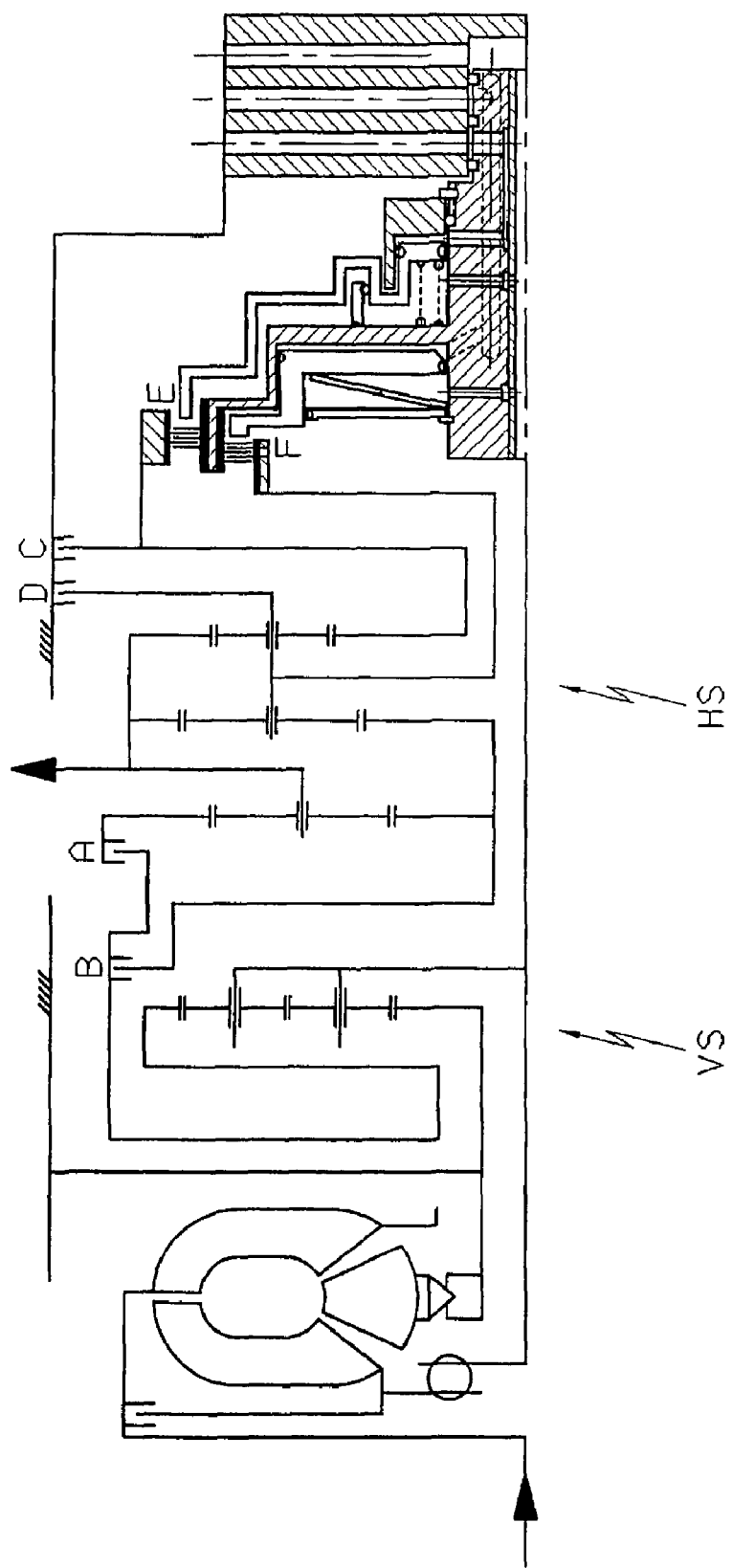
FIG. 9 is an example of an eighth transmission design according to the invention.

Of course, the component arrangement described with reference to FIG. 8 can also be combined with another type of main gearset. A corresponding example is shown in FIG. 9 as an eighth transmission design according to the invention. Here, the main gearset HS is a three-carrier, four-shaft planetary transmission, reduced to a two-carrier planetary transmission, and is made identically to the main gearset HS shown in FIG. 7, so that it need not be described in detail again here.

Figure 10:
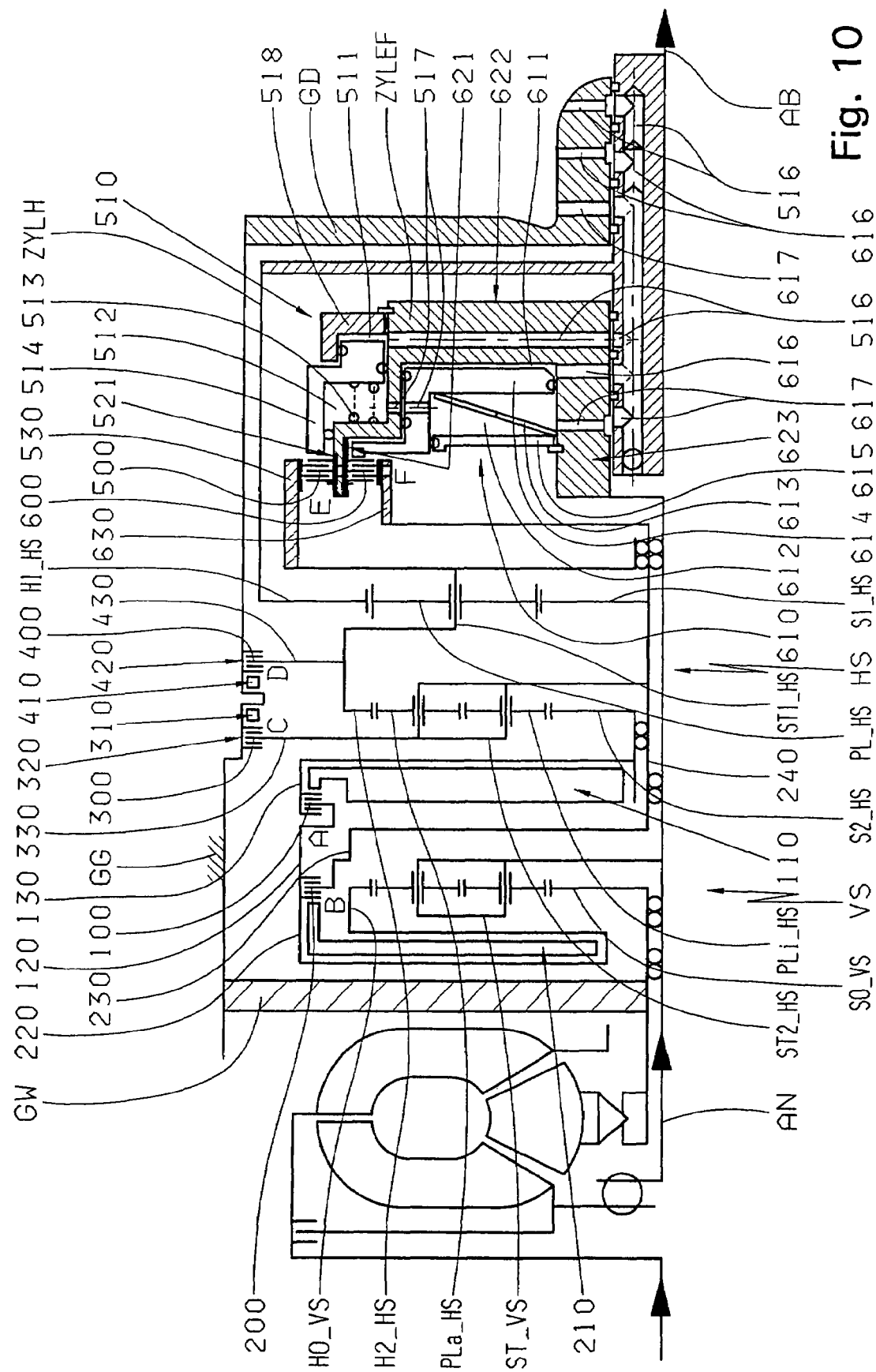
FIG. 10 is an example of a ninth transmission design according to the invention

Referring to FIG. 10, a ninth example transmission design, according to the present invention, will now be explained, again based on the seventh transmission design according to the invention described with reference to FIG. 8, but with a second alternative main gearset HS compared with FIG. 8 and with an alternative design of the structural group comprising the fifth and sixth shift elements E, F compared with FIG. 8.

As can be seen in FIG. 10, the "new" main gearset HS is now made as a two-carrier, four-shaft planetary transmission with three input elements and one output element, comprising two simple planetary gearsets coupled with one another, the first with a simple planetary structure and the second with a double planetary structure. The second simple planetary gearset of the main gearset HS faces toward the transfer gearset VS and comprises a sun gear S2_HS, a ring gear H2_HS, and a coupled carrier ST2_HS, with inner and outer planetary gears PLi_HS, PLa_HS mounted to rotate on it. The inner planetary gears PLi_HS mesh with the sun gear S2_HS and the outer planetary gears PLa_HS, and the outer planetary gears PLa_HS mesh with the inner planetary gears PLi_HS and the ring gear H2_HS. The first simple planetary gearset of the main gearset HS is arranged on the side of the second simple planetary gearset of the main gearset HS facing away from the transfer gearset VS, and comprises a sun gear S1_HS, a ring gear H1_HS and a carrier ST1_HS with planetary gears PL_HS mounted to rotate on it. The planetary gears PL_HS mesh with the sun gear S1_HS and the ring gear H1_HS.

The first sun gear S1_HS and the coupled second carrier ST2_HS of the main gearset HS are connected in a rotationally fixed manner with one another and form the first input element of the main gearset HS, which is connected with the output elements 230, 630 of the two clutches B, F and the output element 330 of the brake C. The output elements 230, 630 of the clutches B, F are connected in a radially fixed manner to the sun gear S1_HS by the first sun shaft 240, the output element 330 of the brake C, in contrast, being connected in a rotationally fixed manner to a carrier plate of the carrier ST2_HS on the transfer gearset side. The input element 220 of clutch B, in turn, is connected to the ring gear HO_VS of the transfer gearset VS. The input element 620 of clutch F, in turn, is connected to the drive input shaft AN. The input element 320 of brake C, in turn, is connected to the transmission housing GG or integrated in the transmission housing GG.

The second sun gear S2_HS of the main gearset HS close to the transfer gearset forms the second input element of the main gearset HS, and is connected to the output element 130 of clutch A. The input element 120 of clutch A, in turn, is connected with the ring gear HO_VS of the transfer gearset VS.

The first carrier ST1_HS and the second ring gear H2_HS of the main gearset HS are connected with one another and form the third input element of the main gearset HS, which is, in turn, connected with the output element 530 of the clutch E and the output element 430 of the brake D. The output element 530 of clutch E is connected in a rotationally fixed manner to a carrier plate of the carrier ST1_HS remote from the transfer gearset, and the output element 430 of brake D, in contrast, is connected in a rotationally fixed manner to the ring gear H2_HS or to a carrier plate of the carrier ST1_HS close to the transfer gearset. In turn, the input element 520 of clutch E is connected to the drive input shaft AN. The input element 420 of brake D, in turn, is connected with the transmission housing GG or integrated in the transmission housing GG.

The first ring gear H1_HS of the main gearset HS remote from the transfer gearset forms the output element of the main gearset HS and is connected with the drive output shaft AB of the transmission. In the example embodiment shown in FIG. 10, the drive output shaft AB runs co-axially with the drive input shaft AN. Those with knowledge of the field will understand, however, that the drive output shaft AB can be also, if necessary, arranged to be axis-parallel or at an angle with the drive input shaft AN, in contrast to the representation of FIG. 10.

The shift scheme of this ninth transmission design according to the invention shown in FIG. 10 corresponds to the shift scheme of the relevant transmission type illustrated in FIG. 1B.

The spatial arrangement of the six shift elements A to F within the transmission housing GG is orientated toward the previously described respective kinematic connections to the individual components of the main gearset HS. As can be seen in FIG. 10, the brake C with its disk set 300 and its servomechanism 310 is arranged in the area of the inside diameter of the transmission housing GG, spatially mainly axially adjacent the main gearset HS on its side close to the transfer gearset, but partially also radially over the second ring gear H2_HS of the main gearset HS close to the transfer gearset. If necessary, in contrast to the representation of FIG. 10, a person with knowledge of the subject could for example also arrange the brake C in an area close to the housing wall GW fixed on the transmission housing, on the side of the transfer gearset VS remote from the main gearset. As can also be seen in FIG. 10, the brake D with its disk set 400 and its servomechanism 410 is also arranged in the area of the inside diameter of the transmission housing GG, but spatially in an area radially over the main gearset HS and thus approximately radially over the second ring gear H2_HS of the main gearset close to the transfer gearset HS.

As can also be seen in FIG. 10, the clutch A is axially directly adjacent to the main gearset HS on its side close to the transfer gearset. The output element 130 of clutch A connected to the second sun gear S2_HS of the main gearset HS is formed as a cylindrical outer disk carrier, geometrically in the form of a pot, open in the direction of the transfer gearset VS, inside which are arranged the disk set 100 of clutch A and the servomechanism 110 of clutch A for actuating the disk set 100. Correspondingly, the servomechanism 110 of clutch A always rotates at the rotational speed of the second sun gear S2_HS of the main gearset HS. The input element 120 of clutch A, correspondingly made as an inner disk carrier, is connected in a rotationally fixed manner by way of the input element 220 of clutch B to the ring gear HO_VS of the transfer gearset VS. In turn, the clutch B is arranged partially on the side of the transfer gearset VS remote from the main gearset and partially radially over the transfer gearset VS, such that the disk set 200 of clutch B is arranged at least partly radially over the ring gear HO_VS of the transfer gearset VS and the servomechanism 210 of clutch B, for actuating this disk set 200, is arranged at least mainly on the side of the transfer gearset VS opposite to the main gearset HS. The input element 220 of clutch B connected with the ring gear HO_VS is made as a cylindrical outer disk carrier, geometrically in the form of a pot, open in the direction of the main gearset HS, inside which are arranged the disk set 200 and the servomechanism 210 of clutch B. The output element 230 of clutch B correspondingly made as an inner disk carrier is adjacent to the transfer gearset VS on its side facing toward the main gearset HS and, to couple it kinematically to the first sun gear S1_HS (and the carrier plate of the second carrier ST2_HS remote from the transfer gearset VS) of the main gearset HS, is connected in its hub area in a rotationally fixed manner to the aforesaid first sun shaft 240. The first sun shaft 240, in turn, encloses the drive input shaft AN and along its axial course, starting from the hub of the output element 230 or inner disk carrier of clutch B, first passes completely and centrally through the coupling space of clutch A formed by the output element 130 or outer disk carrier of clutch A, and then also centrally and completely through the second sun gear S2_HS of the main gearset HS close to the transfer gearset.

As can also be seen in FIG. 10, the two clutches E and F form a structural group which is easily preassembled from the standpoint of production technology, comprising a disk carrier ZYLEF common to the two clutches E, F, a disk set 500 or 600 respectively for the clutches E, F, and servomechanisms 510 and 610 for the respective clutches E, F to actuate their respective disk sets 500 and 600. As in FIG. 8, this structural group is arranged on the side of the main gearset HS opposite the transfer gearset VS, spatially between a housing cover GD fixed to the transmission housing, which forms the outer wall of the transmission opposite the housing wall GW, and the main gearset HS, and is axially adjacent this main gearset HS.

The disk carrier ZYLEF, common to the two clutches E, F, forms the input element for both clutches E, F and is correspondingly connected in a rotationally fixed manner to the drive input shaft AN, which passes centrally through almost the entire transmission in the axial direction. The disk set 500 of clutch E is arranged spatially at least largely radially over the disk set 600 of clutch F, and both disk sets 500, 600 are arranged close to the main gearset HS—in particular, close to its first ring gear H1_HS. Correspondingly, the disk carrier ZYLEF is made for the clutch F as an outer disk carrier to hold externally toothed disks of the radially inner disk set 600 of this structural group, and for clutch E as an inner disk carrier to hold internally toothed disks of the radially outer disk set 500 of the structural group. Also, the servomechanism 510 of clutch E, arranged on the side of the disk set 500 remote from the main gearset, is spatially arranged at least largely radially over the servomechanism 610 of clutch F positioned on the side of the disk set 600 remote from the main gearset.

Geometrically, the disk carrier ZYLEF is made as a pot, open in the direction of the main gearset HS, with a stepped cylindrical section 621 and 521, a pot bottom 622, and with a hub 623. In the area of its end close to the main gearset, the stepped cylindrical section of the disk carrier ZYLEF has on its inside diameter a carrier profile to hold the outer disks of the disk set 600 of clutch F, and on its outer diameter a carrier profile to hold the inner disks of the disk set 500 of clutch E. Correspondingly, the outer diameter of the stepped cylindrical section of the disk carrier ZYLEF is indexed 521, and the inner diameter of this stepped cylindrical section is indexed 621. Adjacent to the end of the stepped cylindrical sections 621 and 521 of the disk carrier ZYLEF remote from the main gearset is the disk-shaped pot bottom 622, which extends radially inward as far as a diameter just above the drive output shaft AB of the transmission. In turn, the hub 623 of the disk carrier ZYLEF is connected on the inner diameter of this pot bottom, and extends axially toward the main gearset HS. This hub 623 is mounted to rotate on the drive output shaft AB. In turn, the drive output shaft AB is mounted to rotate in the housing cover GD and passes centrally through this housing cover GD in the axial direction. In another design of the transmission design different from that shown in FIG. 10, if the drive output shaft AB is not to be arranged co-axially with the drive input shaft AN, then it would be expedient for the hub 623 of the disk carrier ZYLEF to be mounted to rotate on a pin of the housing cover GD attached to the transmission housing and extending axially into the inside space of the transmission in the direction of the main gearset HS.

As can also be seen in FIG. 10, the servomechanism 610 of clutch F is arranged spatially radially over the hub 623 of the disk carrier ZYLEF, completely inside a cylindrical space formed by the disk carrier ZYLEF, or more precisely by the stepped cylindrical section 621 and the pot bottom 622 of the disk carrier ZYLEF. Since the servomechanism 610 is mounted to move axially on this disk carrier ZYLEF, it always rotates at the rotational speed of the drive input shaft AN. The servomechanism 610 comprises a pressure chamber 611, a pressure equalization chamber 612, a piston 614, a restoring element 613 and a diaphragm plate 615. The piston 614 is mounted to move axially and is sealed against pressure medium in the disk carrier ZYLEF, and is pre-stressed axially against the hub 623 of the disk carrier ZYLEF by the restoring element 613, in this case for example made as a cup spring. The pressure chamber 611 is formed by the piston 614 and part of the inner casing surface of the disk carrier ZYLEF. To compensate for the rotational pressure of the rotating pressure chamber 611, dynamic pressure compensation is provided by the pressure equalization chamber 612, this pressure equalization chamber 612 is formed by the piston 614 and the diaphragm plate 615, and arranged closer to the main gearset HS than the pressure chamber 611.

The pressure medium and lubricant supply to the servomechanism 610 of clutch F pass through corresponding ducts and holes which extend partly within the housing wall GW and partly within the drive output shaft AB, and partly within the hub 623 of the disk carrier ZYLEF. The pressure medium supply to the pressure chamber 611 of the servomechanism 610 of clutch F is indexed 616, and the lubricant supply to the pressure equalization chamber 612 of the servomechanism 610 of clutch F is indexed 617. When the pressure chamber 611 is pressurized with pressure medium to engage the clutch F, the piston 614 moves axially toward the main gearset HS and biases the disk set 600 associated with it against the spring force of the restoring element 613.

The servomechanism 510 of the radially outer clutch E is arranged spatially in an area radially over the servomechanism 610 of the radially inner clutch F. This servomechanism 510 comprises a pressure chamber 511, a pressure equalization chamber 512, a piston 514, a restoring element 513 and a support disk 518. The pressure chamber 511 of the servomechanism 510 of the (radially outer) clutch E is arranged at least approximately radially over the pressure chamber 611 of the servomechanism 610 of the (radially inner) clutch F, and the pressure equalization chamber 512 of the servomechanism 510 of the (radially outer) clutch E is arranged at least approximately radially over the pressure equalization chamber 612 of the servomechanism 610 of the (radially inner) clutch F. The pressure chamber 511 is formed by the piston 514, the support disk 518 and part of the outer casing cover of the disk carrier ZYLEF. For this, the support disk 518 is made geometrically in the form of a pot, open in the direction of the disk set 500 or toward the main gearset HS, whose casing surface encloses the piston 514 on the outside, and whose pot bottom is fixed at its inside diameter to the outer diameter of the disk-shaped section of the disk carrier ZYLEF. In the example shown, a carrier profile sealed against pressure medium is provided for fixing the support disk 518 on the disk carrier ZYLEF, and a locking ring is provided to secure it axially. Thus, the piston 514 is mounted to move axially and sealed against pressure medium between the inside diameter of the cylindrical section of the support disk 518 and the outside diameter of the stepped cylindrical section of the disk carrier ZYLEF, and is pre-stressed by the restoring element 513 axially against the disk carrier ZYLEF. In this case the restoring element 513 is made for example as a spring set of spiral springs arranged in a circle.

The pressure medium supply 516 to the pressure chamber 511 of the servomechanism 510 of clutch E passes partly within the housing wall GW and partly within the drive output shaft AB and partly within the pot bottom 622 of the disk carrier ZYLEF. In a space-saving manner, the pressure equalization chamber 512 of the servomechanism 510 of the (radially outer) clutch E is filled with unpressurized lubricant directly via the pressure equalization chamber 612 of the servomechanism 610 of the (radially inner) clutch F. For this, at least one radial hole is provided at the outer diameter of the piston 614 of the servomechanism 610, which opens at one end into the pressure equalization chamber 612 of the servomechanism 610 and at the other end into a ring space sealed against lubricant toward the outside, at the inner diameter of the stepped cylindrical section 621 of the disk carrier ZYLEF. In addition, at least one radial hole is provided in the stepped cylindrical section 621 of the disk carrier ZYLEF, which opens at one end into the ring space on the inside diameter of the stepped cylindrical section 621, and at the other end into the pressure equalization chamber 512 of the servomechanism 510. The corresponding holes and ducts between the two pressure equalization chambers 612, 512 are indexed 517 in FIG. 10. When the pressure chamber 511 of the servomechanism 510 is filled with pressure medium to engage the clutch E, the piston 514 moves axially in the direction of the main gearset HS and biases the disk set 500 associated with it against the spring force of the restoring element 513.

Of course, in another design of the structural group comprising the two clutches E and F it can be provided that, in contrast to the representation of FIG. 10, the servomechanisms 510, 610 of the two clutches E, F are arranged largely next to one another, as proposed for example in FIG. 8.

As can also be seen in FIG. 10, the output element 630 of clutch F is made as a largely disk-shaped inner disk carrier, which is connected in a rotationally fixed manner in its hub area to the first sun gear S1_HS of the main gearset HS remote from the transfer gearset. The output element 530 of clutch E is made as a cylindrical outer disk carrier connected in a rotationally fixed manner to the carrier plate of the first carrier ST1_HS of the main gearset HS remote from the transfer gearset, and is here for example mounted to rotate on the first sun shaft 240 or on a hub of the output element 630 or inner disk carrier of clutch F. The carrier plate of the carrier ST1_HS remote from the transfer gearset and the output element 530 or outer disk carrier of clutch E can also be made as one piece.

To transfer speed and torque between the first ring gear H1_HS of the main gearset remote from the transfer gearset and the drive output shaft AB which, in this case for example, extends co-axially with the drive input shaft AN, a connecting element ZYLF is provided which is made geometrically in the form of a pot, open toward the main gearset HS with a disk-shaped pot bottom and a cylindrical casing, and which completely encloses the structural group formed of the two clutches E, F. The pot bottom of this connecting element ZYLF is connected in a rotationally fixed manner to the drive output shaft AB (for example by welding), and extends in the radial direction axially between the pot bottom 622 of the disk carrier ZYLEF and the housing wall GW. At its end close to the main gearset, the cylindrical casing of the connecting element ZYLF is connected in a rotationally fixed manner to the ring gear H1_HS (for example with positive locking).

Figure 11:
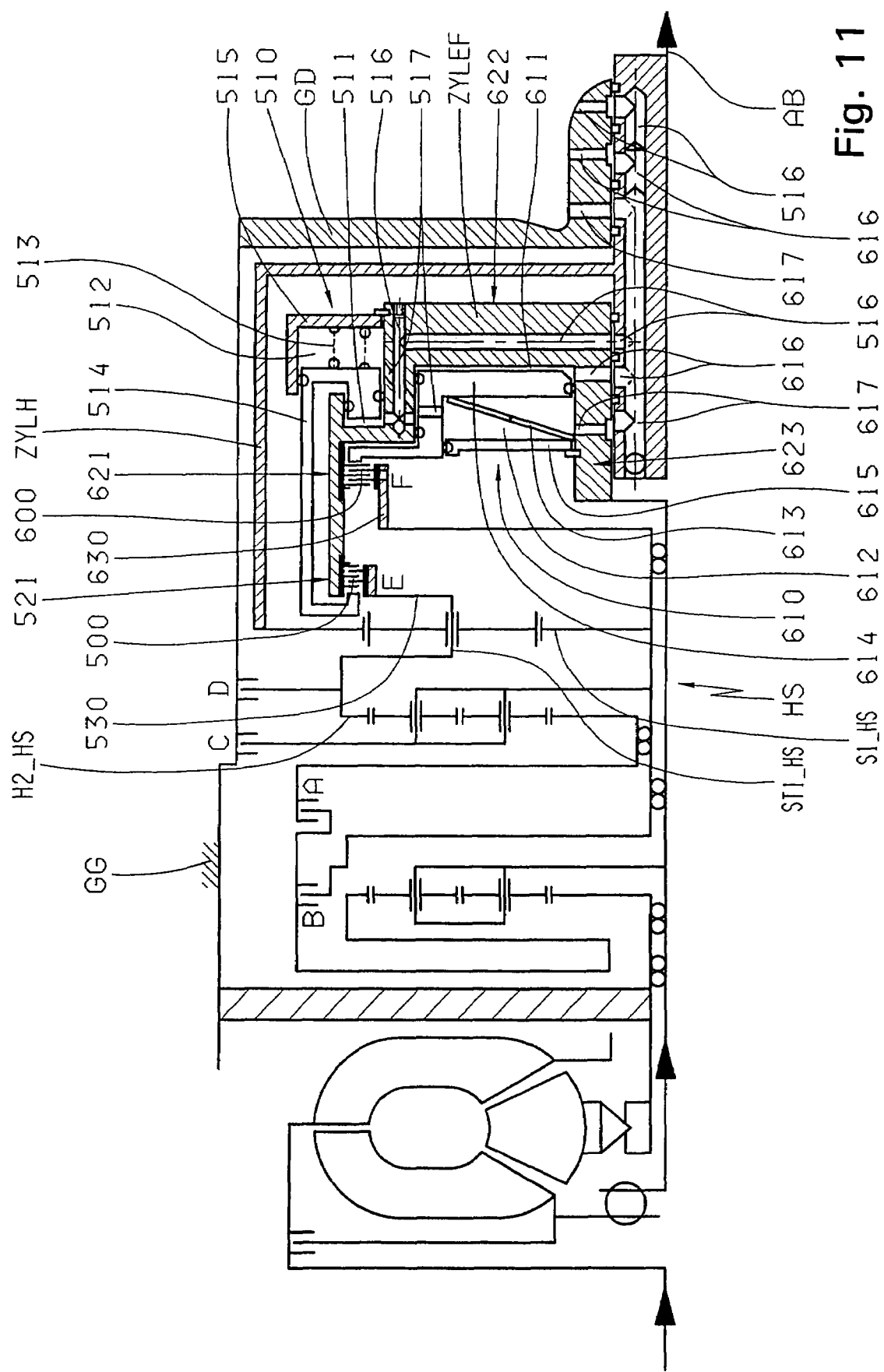
FIG. 11 is an example of a tenth transmission design according to the invention.

Referring to FIG. 11, a tenth example transmission design, according to the present invention, will now be explained, which is based on the ninth transmission design according to the invention described with reference to FIG. 10, but with a design of the structural group comprising the fifth and sixth shift elements E, F different from that of FIG. 10. Accordingly, the explanation of this tenth transmission design according to the invention can be limited to the description of this modified structural group.

As can be seen in FIG. 11, the structural group comprises, as before, a disk carrier ZYLEF common to the two clutches E, F, which forms their input element and is accordingly connected with the drive input shaft AN of the transmission, a respective disk set 500 and 600 for each of the two clutches E, F, and a respective servomechanism 510 and 610 for each of the two clutches E, F, to actuate the respective disk sets 500 and 600. In contrast to FIG. 10, the disk sets 500, 600 of the two clutches E, F are now arranged axially next to one another, preferably on the same or at least on a similar diameter.

In the example embodiment shown in FIG. 11, the disk carrier ZYLEF, common to the two clutches E, F and connected in a rotationally fixed manner to the drive input shaft AN, is now made for both of the clutches E, F as an outer disk carrier. In accordance with the kinematic connection of the output element 530 of clutch E (now made as an inner disk carrier) to the first carrier ST1_HS of the main gearset HS (coupled with the second ring gear H2_HS), and in accordance with the kinematic coupling of the output element 630 of clutch F (made as an inner disk carrier) to the first sun gear S1_HS of the main gearset HS, the disk set 500 of clutch E is arranged closer to the main gearset HS than the disk set 600 of clutch F.

Geometrically, the disk carrier ZYLEF is made as a pot, open in the direction of the main gearset HS, with a stepped cylindrical section 621 and 521, a pot bottom 622 and with a hub 623. In the area of its end close to the main gearset the stepped cylindrical section of the disk carrier ZYLEF has on its inner diameter a carrier profile to hold the outer disks of the disk set 500 of clutch E. Correspondingly, this part of the stepped cylindrical section of the disk carrier ZYLEF is index 521. In the area approximately in the middle of its axial extension, the stepped cylindrical section of the disk carrier ZYLEF has on its inner diameter a carrier profile to hold the outer disks of the disk set 600 of clutch F. Correspondingly, this part of the stepped cylindrical section of the disk carrier ZYLEF is indexed 621. At the end of the stepped cylindrical section 621 of the disk carrier ZYLEF remote from the main gearset is connected the disk-shaped pot bottom 622, which extends radially inward as far as a diameter just above the drive output shaft AB of the transmission. The hub 623 of the disk carrier ZYLEF is connected at the inner diameter of this pot bottom 622, and extends axially toward the main gearset HS. This hub 623 is mounted to rotate on the drive output shaft AB. In turn, the drive output shaft AB is mounted to rotate in the housing cover GD and passes centrally through this housing cover GD in the axial direction. In another design of the transmission design different from that of FIG. 11, if the drive output shaft AB is not arranged co-axially with the drive input shaft AN, it would be expedient for the hub 623 of the disk carrier ZYLEF to be mounted to rotate on a pin of the housing cover GD attached to the transmission housing and extending axially inward into the transmission toward the main gearset HS.

As can also be seen in FIG. 11, the servomechanism 610 of clutch F is spatially arranged radially over the hub 623 of the disk carrier ZYLEF, completely inside a cylindrical space formed by the stepped cylindrical section 621 and the pot bottom 622 of the disk carrier ZYLEF. As in FIG. 10, the servomechanism 610 comprises a pressure chamber 611, a pressure equalization chamber 612, a piston 614, a restoring element 613 and a diaphragm plate 615. The piston 614, sealed against pressure medium, is mounted to move axially in the disk carrier ZYLEF and is pre-stressed axially against the hub 623 of the disk carrier ZYLEF, by the restoring element 613 here for example made as a cup spring. The pressure chamber 611 is formed by the piston 614 and part of the inner casing surface of the disk carrier ZYLEF. To compensate for the rotational pressure of the pressure chamber 611 which always rotates at the rotational speed of the drive input shaft AN, dynamic pressure compensation is provided by the pressure equalization chamber 612 which can be filled with unpressurized lubricant, this pressure equalization chamber 612 being formed by the piston 614 and the diaphragm plate 615, and being arranged closer to the main gearset HS than the pressure chamber 611. The pressure medium and lubricant supply 616 and 617 respectively to the servomechanism 610 of clutch F are the same as in FIG. 10. When the pressure chamber 611 is pressurized with pressure medium to engage the clutch F, the piston 614 moves axially toward the main gearset HS and biases the disk set 600, associated with it, against the spring force of the restoring element 613. In relation to the spatial position of its pressure chamber 611, the servomechanism 610 biases the disk set 600 associated with it "by compression" when the clutch F is engaging.

In contrast to FIG. 10, in this tenth transmission according to the invention shown in FIG. 11 the servomechanism 510 of clutch E biases the disk set 500, associated with it, "in tension" when the clutch is engaging. In the example embodiment shown in FIG. 11, this servomechanism 510 of clutch E is arranged essentially radially above the servomechanism 610 of clutch F. A pressure chamber 511 of the servomechanism 510 of clutch E is now arranged spatially approximately radially over the pressure equalization chamber 612 of the servomechanism 610 of clutch F. Correspondingly, a pressure equalization chamber 512 of the servomechanism 510 of clutch E is provided in order to compensate for the dynamic pressure of the pressure chamber 511 always rotating at the rotational speed of the drive input shaft AN, and is now arranged spatially approximately radially over the pressure chamber 611 of the servomechanism 610 of clutch F. The pressure chamber 511 of the servomechanism 510 is formed by a piston 514 of this servomechanism 510 and by a casing surface ZYLEF located radially outside the coupling space of the clutch F, so that the piston 514 mounted to move axially on the disk carrier ZYLEF is arranged essentially radially above the stepped cylindrical section of this disk carrier ZYLEF. In the example embodiment shown, this pressure chamber 511 associated with the disk set 500 of clutch E is arranged spatially axially next to the disk set 600 of clutch F. To actuate the disk set 500 associated with it, the piston 514 of the servomechanism 510 of clutch E has a pressure plate which acts on the disk set 500 from the side thereof close to the main gearset. Instead of this pressure plate, for example several actuating fingers can be provided, distributed around the periphery. The piston 514 and pressure plate or actuating fingers of this piston 514 radially completely overlap the two disk sets 500 and 600 arranged next to one another in the axial direction. The pressure equalization chamber 512 of the servomechanism 510 of clutch E, which is arranged on the side of the pressure chamber 511 facing away from the disk set 500 and can be filled with unpressurized lubricant, is formed by the piston 514 and by a pot-shaped diaphragm plate 515. This diaphragm plate 515 is fixed on the outside adjacent the disk carrier ZYLEF in the area of its pot bottom 622, and can move axially relative to the piston 514, sealed against lubricant. The pressure medium and lubricant supply 516 and 517 to the servomechanism 510 of clutch E are routed as in FIG. 10. When the pressure chamber 511 is filled with pressure medium, the piston 514 moves axially in the direction away to the main gearset HS against the spring force of the restoring element 513, here made for example as a spiral spring set held axially between the piston 514 and the diaphragm plate 515.

In other respects, the component arrangement shown in FIG. 11 corresponds to the arrangement already explained in detail with reference to FIG. 10.

Of course, in another design of the structural group comprising the two clutches E and F, it can also be provided that in contrast to the representation of FIG. 11, the servomechanisms 510, 610 of the two clutches E, F are arranged largely next to one another, as for example proposed in FIG. 8, and then, as in FIG. 10, a pressure plate acting on the disk set 500 of clutch E or preferably several actuating fingers of the piston 514 of the servomechanism 510 distributed peripherally and acting on the disk set 500 of clutch E have to overlap the disk sets 600, 500 arranged next to one another in the axial direction, radially on the outside.

Figure 12:
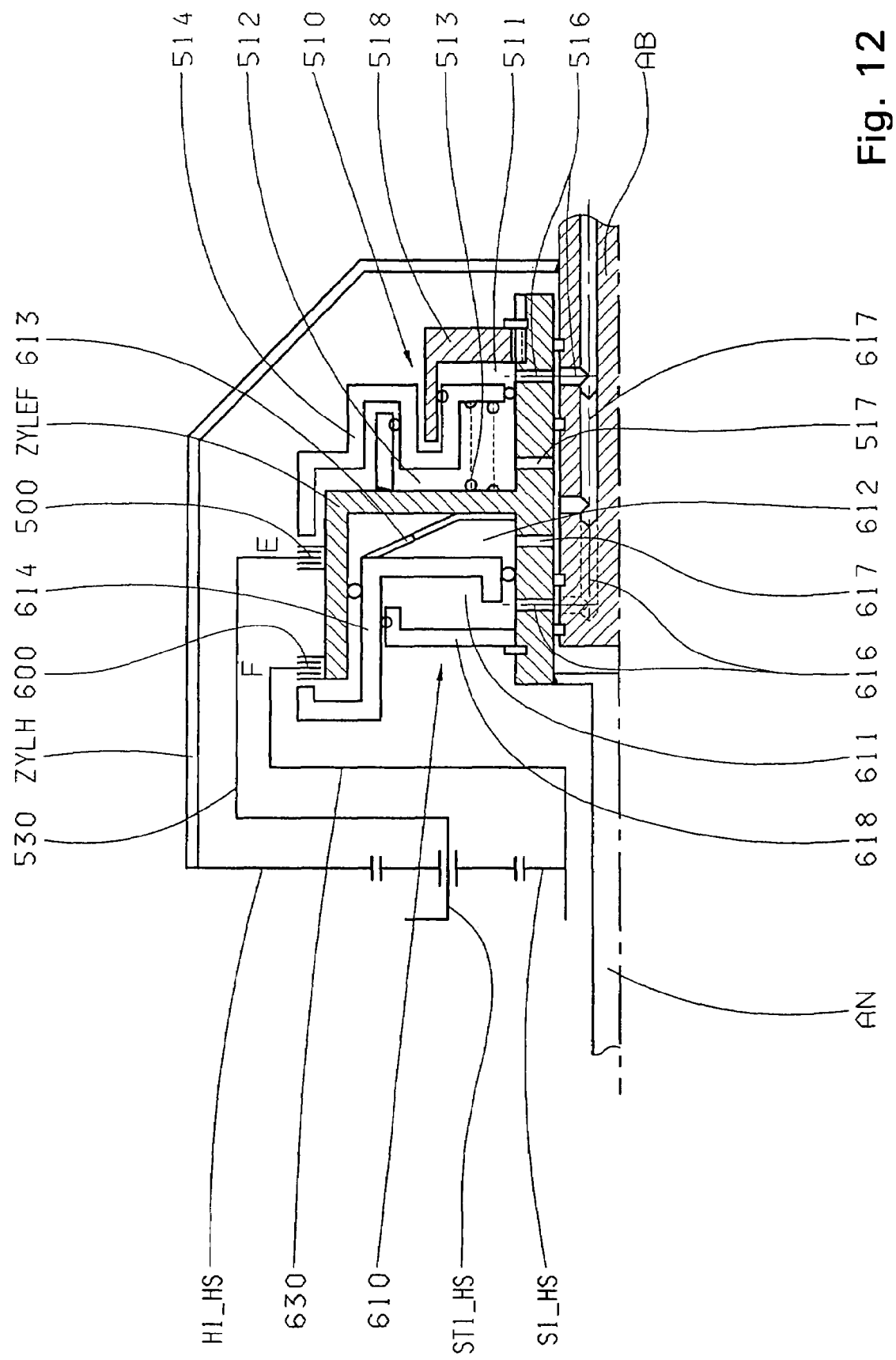
FIG. 12 is a design variation of the tenth transmission design according to the invention shown in FIG. 11.

In still another design of the structural group comprising the two clutches E and F, it can for example also be provided that the disk sets 500, 600 of the two clutches E, F, as in FIG. 7, are arranged directly next to one another but with the disk set 600 of clutch F, differing from FIG. 11, positioned closer to the main gearset HS, than the disk set 500 of clutch E. In accordance with the kinematic connection of the output element 530 of clutch E to the first carrier ST1_HS of the main gearset HS (coupled with the second ring gear H2_HS), and in accordance with the kinematic connection of the output element 630 of clutch F to the first sun gear S1_HS of the main gearset HS, in this case the disk carrier ZYLEF common to the two clutches E, F must be made for both clutches E, F as an inner disk carrier and the output element 530 of clutch E, which is then made as an outer disk carrier, therefore overlaps the output element 630 of clutch F, which is also made as an outer disk carrier, in the axial direction, radially on the outside. As a rule, the practical design of this embodiment will result in the fact that the servomechanism 610 of clutch F is arranged essentially closer to the main gearset HS than the servomechanism 510 of clutch E. In particular, a pressure chamber 611 of the servomechanism 610 of clutch F will then, as a rule, be arranged closer to the main gearset HS than a pressure chamber 511 of the servomechanism 510 of clutch F. Depending on the structural space available, the servomechanism 510 of clutch E can be arranged spatially at least largely radially over the servomechanism 610 of clutch F or at least largely on the side of the servomechanism 610 of clutch F opposite to the main gearset HS. In contrast to FIG. 11, in this embodiment the servomechanism 610 biases the disk set 600 associated with it when clutch F is engaging, axially in the direction opposite to the main gearset HS, i.e., "in tension" in relation to the spatial position of its pressure chamber 611, while in contrast the servomechanism 510 biases the disk set 500 associated with it when clutch E is engaged, axially in the direction toward the main gearset HS, i.e., "by compression" in relation to the spatial position of its pressure chamber 511. If dynamic pressure compensation is provided for the clutch F, the pressure chamber 611 of the servomechanism 610 of clutch F would then be arranged closer to the main gearset HS than the pressure equalization chamber 612 of this servomechanism 610 required for the dynamic compensation. If dynamic pressure compensation is provided for clutch E, a pressure equalization chamber 512 of the servomechanism 510 of clutch E, necessary for this dynamic pressure compensation, would then expediently be arranged closer to the main gearset HS than the pressure chamber 511 of the servomechanism 510, regardless of the already mentioned possible spatial position of this servomechanism 510 radially above or axially adjacent the servomechanism 610 of clutch F. An outline of a possible construction of this proposed embodiment of the structural group formed by the clutches E, F is shown in FIG. 12.

Finally, let it again be mentioned that the various component arrangements according to the invention can also be combined without problems with the various main gearset embodiments explained earlier.

REFERENCE NUMERALS

A first shift element, clutch
B second shift element, clutch
C third shift element, brake
D fourth shift element, brake
E fifth shift element, clutch
F sixth shift element, clutch
AN drive input shaft
AB drive output shaft
GD housing cover
GG transmission housing
GN hub on the housing wall
GW housing wall
GZ intermediate housing wall
NAN toothed profile for drive input speed determination
ZYL cylindrical connecting element
ZYLB cylindrical connecting element
ZYLF cylindrical connecting element
ZYLAB disk carrier common to the first and second shift elements
ZYLBF disk carrier common to the second and sixth shift elements
ZYLCD disk carrier common to the third and fourth shift elements
ZYLEF disk carrier common to the fifth and sixth shift elements
VS transfer gearset
HO_VS ring gear of the transfer gearset
SO_VS sun gear of the transfer gearset
ST_VS (coupled) carrier of the transfer gearset
P1_VS inner planetary gear of the transfer gearset
P2_VS outer planetary gear of the transfer gearset main gearset
HS first ring gear of the main gearset
H1_HS second ring gear of the main gearset
H2_HS coupled (second) ring gear of the main gearset
H23_HS first sun gear of the main gearset
S1_HS second sun gear of the main gearset
S2_HS third sun gear of the main gearset
S3_HS fourth sun gear of the main gearset
S4_HS coupled (single) carrier of the main gearset
ST_HS first carrier of the main gearset
ST13_HS coupled (first) carrier of the main gearset
ST2_HS second carrier of the main gearset
P13_HS coupled long planetary gear of the main gearset
P2_HS short planetary gear of the main gearset
PL_HS first planetary gear of the main gearset
PLa_HS outer planetary gear of the main gearset
PLi_HS inner planetary gear of the main gearset
100 disks of the first shift element
110 servomechanism of the first shift element
111 pressure chamber of the servomechanism of the first shift element
112 pressure equalization chamber of the servomechanism of the first shift element
113 restoring element of the servomechanism of the first shift element
114 piston of the servomechanism of the first shift element
115 diaphragm plate of the servomechanism of the first shift element
120 input element of the first shift element
123 hub of the input element of the first (and second) shift element 130 output element of the first shift element
140 second sun shaft
150 carrier disk
200 disks of the second shift element
210 servomechanism of the second shift element
211 pressure chamber of the servomechanism of the second shift element
212 pressure equalization chamber of the servomechanism of the second shift element
213 restoring element of the servomechanism of the second shift element
214 piston of the servomechanism of the second shift element
215 diaphragm plate of the servomechanism of the second shift element
216 pressure medium supply to the pressure chamber of the servomechanism of the second shift element
217 lubricant supply to the pressure equalization chamber of the servomechanism of the second shift element
218 support disk of the servomechanism of the second shift element
219 hub of the servomechanism of the second shift element
220 input element of the second shift element
223 hub of the input element of the second shift element
230 output element of the second shift element
233 hub of the output element of the second shift element
240 first sun shaft
250 carrier plate
300 disks of the third shift element
310 servomechanism of the third shift element
311 pressure chamber of the servomechanism of the third shift element
313 restoring element of the servomechanism of the third shift element
314 piston of the servomechanism of the third shift element
320 input element of the third shift element
330 output element of the third shift element
400 disks of the fourth shift element
410 servomechanism of the fourth shift element
411 pressure chambers of the servomechanism of the fourth shift element
413 restoring element of the servomechanism of the fourth shift element
414 piston of the servomechanism of the fourth shift element
420 input element of the fourth shift element
430 output element of the fourth shift element
500 disks of the fifth shift element
510 servomechanism of the fifth shift element
511 pressure chamber of the servomechanism of the fifth shift element
512 pressure equalization chamber of the servomechanism of the fifth shift element
513 restoring element of the servomechanism of the fifth shift element
514 piston of the servomechanism of the fifth shift element
515 diaphragm plate of the servomechanism of the fifth shift element
520 input element of the fifth shift element
520 cylindrical section of the input element of the fifth shift element
521 disk-shaped section of the input element of the fifth shift element
523 hub of the input element of the fifth shift element
530 output element of the fifth shift element
540 carrier shaft
600 disks of the sixth shift element
610 servomechanism of the sixth shift element
611 pressure chamber of the servomechanism of the sixth shift element
612 pressure equalization chamber of the servomechanism of the sixth shift element
613 restoring element of the servomechanism of the sixth shift element
614 piston of the servomechanism of the sixth shift element
615 diaphragm plate of the servomechanism of the sixth shift element
616 pressure medium supply to the pressure chamber of the servomechanism of the sixth shift element
617 lubricant supply to the pressure equalization chamber of the servomechanism of the sixth shift element
618 support disk of the servomechanism of the sixth shift element
620 input element of the sixth shift element
621 cylindrical section of the input element of the sixth shift element
622 disk-shaped section of the input element of the sixth shift element
623 hub of the input element of the sixth shift element
630 output element of the sixth shift element
633 hub of the output element of the sixth shift element
640 third sun shaft

The invention claimed is:
1. A multi-stage automatic transmission comprising:
a drive input shaft (AN),
a drive output shaft (AB), and
a transmission housing (GG);
a transfer gearset (VS) of a double planetary gearset design comprising a sun gear (SO_VS), a ring gear (HO_VS), a coupled carrier (ST_VS) rotatably supporting inner planetary gears (P1_VS) and outer planetary gears (P2_VS);
a main gearset (HS) of a three-carrier, five-shaft coupled planetary gearset reduction transmission design comprising first, second and third sun gears (S1_HS, S2_HS, S3_HS), a coupled ring gear (H13_HS), a second ring gear (H2_HS), a coupled carrier (ST13_HS) rotatably supporting longer planetary gears (P13_HS), a second carrier (ST2_HS) rotatably supporting shorter planetary gears (P2_HS), a plurality of uncoupled input elements and an output element; and
at least first, second, third, fourth, fifth and sixth shift elements (A, B, C, D, E, F) and each of the first shift element (A), the second shift element (B), the third shift element (C), the fourth shift element (D), the fifth shift element (E) and the sixth shift element (F) having an input element (120, 220, 320, 420, 520, 620) and an output element (130, 230, 330, 430, 530, 630);
an output element of the transfer gearset (VS) rotates at a rotational speed slower than a rotational speed of the drive input shaft (AN);
an input element of the transfer gearset (VS) is fixed to the drive input shaft (AN);
the output element of the main gearset (HS) is permanently connected to the drive output shaft (AB);
the input element (120) of the first shift element (A) is connected to the output element of the transfer gearset (VS);
the output element (130) of the first shift element (A) is connected to a second input element of the main gearset (HS);
the input element (220) of the second shift element (B) is connected to the output element of the transfer gearset (VS);

the output element (230) of the second shift element (B) is connected to a first input element of the main gearset (HS);

the input element (320) of the third shift element (C) is connected to the transmission housing (GG);

the output element (330) of the third shift element (C) is connected to one of the first input element of the main gearset (HS) and another input element of the main gearset (HS) which is close to the first input element of the main gearset (HS);

the input element (420) of the fourth shift element (D) is connected to the transmission housing (GG);

the output element (430) of the fourth shift element (D) is connected to a third input element of the main gearset (HS);

the input element (520) of the fifth shift element (E) is connected to the drive input shaft (AN);

the output element (530) of the fifth shift element (E) is connected to the third input element of the main gearset (HS);

the input element (620) of the sixth shift element (F) is connected to the drive input shaft (AN);

the output element (630) of the sixth shift element (F) is connected to one of the first input element of the main gearset (HS) and another input element of the main gearset (HS) which is close to the first input element of the main gearset (HS);

the fifth shift element (E) and the sixth shift element (F) form a structural group comprising a disk carrier (ZYLEF) common to both the fifth shift element (E) and the sixth shift element (F), a disk set (500) coupled to the fifth shift element (E), a disk set (600) coupled to the sixth shift element (F), a servomechanism (510) for the fifth shift element (E) to actuate the disk set (500) of the fifth shift element (E) and a servomechanism (610) for the sixth shift element (F) to actuate the disk set (600) of the sixth shift elements (F);

the inner planetary gears (P1_VS) of the transfer gearset (VS) engage the sun gear (SO_VS) of the transfer gearset (VS) and the outer planetary gears (P2_VS) of the transfer gearset (VS);

the outer planetary gears (P2_VS) of the transfer gearset (VS) engage the inner planetary gears (P1_VS) of the transfer gearset (VS) and the ring gear (HO_VS) of the transfer gearset (VS);

the coupled carrier (ST_VS) of the transfer gearset (VS) is the input element of the transfer gearset (VS);

the ring gear (HO_VS) of the transfer gearset (VS) is the output element of the transfer gearset (VS) and is connectable to at least one of the plurality input elements of the main gearset (HS);

the sun gear (SO_VS) of the transfer gearset (VS) is fixed on the transmission housing (GG);

the first sun gear (S1_HS) of the main gearset (HS) is axially located between the second sun gear (S2_HS) of the main gearset (HS) and the third sun gear (S3_HS) of the main gearset (HS);

the longer planetary gears (P13_HS) of the main gearset (HS) engage the coupled ring gear (H13_HS) of the main gearset (HS), the first sun gear (S1$_{13}$ HS) of the main gearset (HS) and the third sun gear (S3_HS) of the main gearset (HS);

the shorter planetary gears (P2_HS) of the main gearset (HS) engage the second ring gear (H2_HS) of the main gearset (HS) and the second sun gear (S2_HS) of the main gearset (HS);

the first sun gear (S1_HS) of the main gearset (HS) is fixed to the second sun gear (S2_HS) of the main gearset (HS) to form the first input element of the main gearset (HS);

the second ring gear (H2_HS) of the main gearset (HS) is the second input element of the main gearset (HS);

the coupled carrier (ST13_HS) of the main gearset (HS) is the third input element of the main gearset (HS);

the third sun gear (S3_HS) of the main gearset (HS) forms a fourth input element of the main gearset (HS) and is connected to the output element (330) of the third shift element (C) and the output element (630) of the sixth shift element (F); and the coupled ring gear (H13_HS) of the main gearset (HS) is fixed to the second carrier (ST2_HS) of the main gearset (HS) to form the output element of the main gearset (HS).

2. The multi-stage automatic transmission according to claim 1, wherein the coupled carrier (ST13_HS) of the main gearset (HS) comprises a carrier plate which extends radially inward and axially between the first sun gear (S1_HS) of the main gearset (HS) and the third sun gear (S3_HS) of the main gearset (HS) and is connected in a rotationally fixed manner with the output element (530) of the fifth shift element (E), such that the output element (530) of the fifth shift element (E) and one of a hub of the carrier plate and a carrier shaft (540), connected in a rotationally fixed manner with the carrier plate, axially pass centrally through one of the third sun gear (S3_HS) of the main gearset (HS) and one of the first sun gear (S1_HS) of the main gearset (HS) and the second sun gear (S2_HS) of the main gearset (HS).

3. The multi-stage automatic transmission according to claim 1, wherein the disk carrier (ZYLEF), common to the fifth shift element (E) and the sixth shift element (F), is the input element (520) of the fifth shift element (E) and the input element (620) of the sixth shift element (F).

4. The multi-stage automatic transmission according to claim 1, wherein the structural group comprising the fifth shift element (E) and the sixth shift element (F) is spatially located at least substantially on a side of the transfer gearset (VS) opposite the main gearset (HS).

5. The multi-stage automatic transmission according to claim 4, wherein the first shift element (A) and the second shift element (B) are located at least substantially on a side of the transfer gearset (VS) opposite the structural group comprising the fifth shift element (E) and the sixth shift element (F).

6. The multi-stage automatic transmission according to claim 4, wherein the first shift element (A) is one of located closer to the transfer gearset (VS) than the second shift element (B); and is axially directly adjacent the transfer gearset (VS) on a side of the transfer gearset (VS) facing the main gearset (HS).

7. The multi-stage automatic transmission according to claim 4, wherein one of the output element (530) of the fifth shift element (E) and a connecting element (ZYL) coupled to the output element (530) of the fifth shift element (E) completely radially overlaps the transfer gearset (VS), the first shift element (A) and the second shift element (B) in an axial direction, and the output element (630) of the sixth shift element (F) at least substantially radially overlaps one of the output element (530) of the fifth shift element (E) and the connecting element (ZYL) coupled to the output element (530) of the fifth shift element (E) in the axial direction.

8. The multi-stage automatic transmission according to claim 4, wherein one of the output element (630) of the sixth shift element (F) and a connecting element (ZYL) coupled to the output element (630) of the sixth shift element (F) completely radially overlaps the transfer gearset (VS), the first shift element (A) and the second shift element (B) in an axial direction, and the output element (530) of the fifth shift element (E) at least substantially radially overlaps one of the output element (630) of the sixth shift element (F) and the connecting element (ZYL) coupled to the output element (630) of the sixth shift element (F) in the axial direction.

9. The multi-stage automatic transmission according to claim 4, wherein at least one of the third shift element (C) and the fourth shift element (D) are located on the side of the transfer gearset (VS) opposite the structural group comprising the fifth shift element (E) and the sixth shift element (F).

10. The multi-stage automatic transmission according to claim 1, wherein the structural group comprising the fifth shift element (E) and the sixth shift element (F) is axially located at least substantially between the transfer gearset (VS) and the main gearset (HS).

11. The multi-stage automatic transmission according to claim 1, wherein the structural group comprising the fifth shift element (E) and the sixth shift element (F) is one of radially arranged at least partially under a disk set (200) of the second shift element (B) such that the output element (230) of the second shift element (B) at least partially radially overlaps the structural group comprising the structural group comprising the fifth shift element (E) and the sixth shift element (F) in an axial direction; and
   radially arranged at least partially under a disk set (100) of the first shift element (A).

12. The multi-stage automatic transmission according to claim 10, wherein at least one of the third shift element (C) and the fourth shift element (D) are located on a side of the main gearset (HS) opposite the transfer gearset (VS).

13. The multi-stage automatic transmission according to claim 10, wherein the structural group comprising the fifth shift element (E) and the sixth shift element (F) is located at least substantially on a side of the main gearset (HS) opposite the transfer gearset (VS).

14. The multi-stage automatic transmission according to claim 13, wherein one of the first shift element (A) and the second shift element (B) are located at least substantially on a side of the main gearset (HS) opposite the structural group comprising the fifth shift element (E) and the sixth shift element (F); and
   at least one of the third shift element and (C) the fourth shift element (D) is located at least substantially on a side of the main gearset (HS) facing the structural group comprising the fifth shift element (E) and the sixth shift element (F).

15. The multi-stage automatic transmission according to claim 10, wherein at least one of the third shift element (C) and the fourth shift element (D) is one of arranged at least partially over the main gearset (HS) and located on a side of the main gearset (HS) opposite the structural group comprising the fifth shift element (E) and the sixth shift element (F).

16. The multi-stage automatic transmission according to claim 10, wherein the first shift element (A) is one of arranged closer to the main gearset (HS) than the second shift element (B); and
   axially directly adjacent the main gearset (HS) on a side of the main gearset (HS) facing the transfer gearset (VS).

17. The multi-stage automatic transmission according to claim 1, wherein the disk set (500) of the fifth shift element (E) is radially arranged at least partially over the disk set (600) of the sixth shift element (F).

18. The multi-stage automatic transmission according to claim 17, wherein one of the servomechanism (510) of the fifth shift element (E) and the servomechanism (610) of the sixth shift element (F) are spatially located at least substantially adjacent and are separated substantially only by a casing surface of the disk carrier (ZYLEF) common to the fifth shift element (E) and the sixth shift element (F); and
   the servomechanism (510) of the fifth shift element (E) is radially spatially arranged at least substantially over the servomechanism (610) of the sixth shift element (F), and is separated from the servomechanism (610) of the sixth shift element (F) substantially only by a casing surface of the disk carrier (ZYLEF) common to the fifth element (E) and the sixth shift element (F).

19. The multi-stage automatic transmission according to claim 1, wherein the disk set (600) of the sixth shift element (F) is radially arranged at least partially over the disk set (500) of the fifth shift element (E).

20. The multi-stage automatic transmission according to claim 1, wherein the transmission comprises one of:
   one of the disk carrier (ZYLEF), common to the fifth shift element (E) and the sixth shift element (F), is rotatably supported by a hub (GN) fixed to one of the transmission housing (GG), a housing wall (GW) fixed to the transmission housing (GG) and a housing cover (GD) fixed to the transmission housing (GG), and at least one of a pressure medium supply (511) to the servomechanism (510) of the fifth shift element (E), a lubricant supply (512) to the servomechanism (510) of the fifth shift element (E), a pressure medium supply (611) to the servomechanism (610) of the sixth shift element (F) and a lubricant supply (612) to the servomechanism (610) of the sixth shift element (F) pass partly within one of the hub (GN) fixed to the transmission housing (GG), the housing wall (GW) fixed to the transmission housing (GG) and the housing cover (GD) fixed to the transmission housing (GG); and
   the disk carrier (ZYLEF), common to the fifth shift element (E) and the sixth shift element (F), is mounted to rotate on the drive output shaft (AB), and at least one of a pressure medium supply (511) to the servomechanism (510) of the fifth shift element (E), a lubricant supply (512) to the servomechanism (510) of the fifth shift element (E), a pressure medium supply (611) to the servomechanism (610) of the sixth shift element (F) and a lubricant supply (612) to the servomechanism (610) of the sixth shift element (F) pass partially within the drive output shaft (AB).

21. The multi-stage automatic transmission according to claim 20, wherein one of the servomechanism (510) of the fifth shift element (E) and the servomechanism (610) of the sixth shift element (F) are arranged spatially at least substantially adjacent and are separated substantially only by a casing surface of the disk carrier (ZYLEF) common to the fifth shift element (E) and the sixth shift element (F); and
   the servomechanism (610) of the sixth shift element (F) is radially arranged at least substantially over the servomechanism (510) of the fifth shift element (E), and is separated from the servomechanism (510) of the fifth shift element (E) substantially only by a casing surface of the disk carrier (ZYLEF) common to the fifth shift element (E) and the sixth shift element (F).

22. The multi-stage automatic transmission according to claim 1, wherein one of the disk set (500) of the fifth shift element (E) is arranged closer to both the main gearset (HS) and the transfer gearset (VS) than the disk set (600) of the sixth shift element (F) and the disk set (600) of the sixth shift element (F) is arranged closer to both the main gearset (HS) and the transfer gearset (VS) than the disk set (500) of the fifth shift element (E).

23. The multi-stage automatic transmission according to claim 22, wherein at least one of the disk set (500) of the fifth shift element (E) and the disk set (600) of the sixth shift element (F) are arranged at at least a similar diameter; and the servomechanism (510) of the fifth shift element (E) is radially arranged at least substantially over the servomechanism (610) of the sixth shift element (F) and is separated from the servomechanism (610) of the sixth shift element (F) substantially only by a casing surface of the disk carrier (ZYLEF) common to the fifth shift element (E) and the sixth shift element (F).

24. The multi-stage automatic transmission according to claim 22, wherein the servomechanism (510) of the fifth shift element (E) is located at least substantially on a side of the servomechanism (610) of the sixth shift element (F) opposite the main gearset (HS) and is separated from the servomechanism (610) of the sixth shift element (F) substantially only by a casing surface of the disk carrier (ZYLEF) common to the fifth shift element (E) and the sixth shift element (F).

25. The multi-stage automatic transmission according to claim 1, wherein selective engagement of the first shift element (A), the second shift element (B), the third shift element (C), the fourth shift element (D), the fifth shift element (E) and the sixth shift element (F) implements at least eight forward gears ratios and the rotational speed of the drive input shaft (AN) is transmittable to the drive output shaft (AB) such that when shifting from one gear ratio to one of a next higher gear ratio and a next lower gear ratio only one of the first shift element (A), the second shift element (B), the third shift element (C), the fourth shift element (D), the fifth shift element (E) and the sixth shift element (F) is disengaged and another one of the first shift element (A), the second shift element (B), the third shift element (C), the fourth shift element (D), the fifth shift element (E) and the sixth shift element (F) is engaged, and a first forward gear is implemented by engagement of the first shift element (A) and the fourth shift element (D), a second forward gear is implemented by engagement of the first shift element (A) and the third shift element (C), a third forward gear is implemented by engagement of the first shift element (A) and the second shift element (B), a fourth forward gear is implemented by engagement of the first shift element (A) and the sixth shift element (F), a fifth forward gear is implemented by engagement of the first shift element (A) and the fifth shift element (E), a sixth forward gear is implemented by engagement of the fifth shift element (E) and the sixth shift element (F), a seventh forward gear is implemented by engagement of the second shift element (B) and the fifth shift elements (E), an eighth forward gear is implemented by engagement of the third shift element (C) and the fifth shift element (E), and a reverse gear is implemented by engagement of the fourth shift element (D) and one of the second shift element (B) and the sixth shift element (F).

* * * * *